US011610038B2

(12) United States Patent
McFarland

(10) Patent No.: US 11,610,038 B2
(45) Date of Patent: Mar. 21, 2023

(54) RISK EVALUATION

(71) Applicant: Assurant Design Automation LLC, Kennesaw, GA (US)

(72) Inventor: M. David McFarland, Kennesaw, GA (US)

(73) Assignee: Assurant Design Automation LLC, Kennesaw, GA (US)

( * ) Notice: Subject to any disclaimer, the term of this patent is extended or adjusted under 35 U.S.C. 154(b) by 1077 days.

(21) Appl. No.: 16/042,952

(22) Filed: Jul. 23, 2018

(65) Prior Publication Data

US 2018/0330024 A1 Nov. 15, 2018

Related U.S. Application Data

(63) Continuation-in-part of application No. 14/727,530, filed on Jun. 1, 2015, now abandoned.

(51) Int. Cl.
*G06F 30/327* (2020.01)
*G06F 17/18* (2006.01)
*G06F 9/46* (2006.01)
*G06F 111/08* (2020.01)

(52) U.S. Cl.
CPC ............ *G06F 30/327* (2020.01); *G06F 9/46* (2013.01); *G06F 17/18* (2013.01); *G06F 2111/08* (2020.01)

(58) Field of Classification Search
CPC .......... G06F 30/327; G06F 9/46; G06F 17/18; G06F 2111/08
See application file for complete search history.

(56) References Cited

U.S. PATENT DOCUMENTS

| 4,065,915 | A | 1/1978 | Farnbach |
| 6,215,327 | B1 | 4/2001 | Lyke |
| 6,628,215 | B2 | 9/2003 | Talwar et al. |
| 6,654,950 | B1 | 11/2003 | Barnishan |
| 6,898,563 | B1 * | 5/2005 | McFarland ........... G06F 30/327 714/724 |
| 7,346,864 | B2 | 3/2008 | Srouji et al. |
| 7,605,607 | B2 | 10/2009 | Ng |
| 7,784,005 | B1 | 8/2010 | Ng |
| 7,890,896 | B2 | 2/2011 | Moon |
| 8,739,084 | B2 | 5/2014 | Swann |
| 9,112,490 | B1 * | 8/2015 | Hamlet ............... H03K 19/003 |

(Continued)

OTHER PUBLICATIONS

U.S. Appl. No. 16/043,031, Office Action Summary, dated Jun. 1, 2020, pp. 1-27.

(Continued)

*Primary Examiner* — Bijan Mapar

(74) *Attorney, Agent, or Firm* — Kunzler Bean & Adamson; Scott D. Thorpe

(57) ABSTRACT

For risk evaluation, a method encodes event data as a linear array that includes a plurality of logic states. The method estimates a success probability for each logic state and identifies path groups of the plurality of logic states. The logic states of each path group must all be healthy for each logic state to contribute to system success. The method further identifies each path combination of path groups and path nodes that result in system success. In addition, the method calculates a system success probability as a sum of success probabilities for each path combination. The success rate for each path combination is calculated as a product of the path group success probabilities for the path combination.

18 Claims, 26 Drawing Sheets

(56) References Cited

U.S. PATENT DOCUMENTS

| | | |
|---|---|---|
| 9,396,298 B1 | 7/2016 | McFarland |
| 9,535,665 B2 | 1/2017 | McFarland |
| 9,536,029 B2 | 1/2017 | McFarland |
| 9,590,858 B2 | 3/2017 | McFarland |
| 2001/0044708 A1* | 11/2001 | Talwar .................. G06F 30/30 703/2 |
| 2006/0095824 A1 | 5/2006 | McGrath |
| 2007/0011113 A1* | 1/2007 | Mosleh ................ G06N 7/005 706/14 |
| 2007/0118339 A1* | 5/2007 | Moon ............... G06F 30/3323 703/2 |
| 2009/0204931 A1 | 8/2009 | Lim et al. |
| 2010/0229132 A1* | 9/2010 | Gu ...................... G06F 30/327 716/136 |
| 2010/0251201 A1 | 9/2010 | Chin et al. |
| 2013/0019215 A1* | 1/2013 | Swann ................ G06F 30/327 716/102 |
| 2013/0125104 A1 | 5/2013 | Vallur et al. |
| 2014/0085979 A1 | 3/2014 | Kono |
| 2016/0350087 A1 | 12/2016 | McFarland |
| 2016/0350447 A1 | 12/2016 | McFarland |
| 2016/0350448 A1 | 12/2016 | McFarland |
| 2016/0350449 A1 | 12/2016 | McFarland |
| 2016/0350450 A1 | 12/2016 | McFarland |
| 2016/0350668 A1 | 12/2016 | McFarland |
| 2018/0253513 A1 | 9/2018 | McFarland |
| 2018/0300112 A1 | 10/2018 | McFarland |
| 2018/0330023 A1 | 11/2018 | McFarland |
| 2018/0330025 A1 | 11/2018 | McFarland |
| 2018/0330026 A1 | 11/2018 | McFarland |
| 2019/0384583 A1 | 12/2019 | McFarland |

OTHER PUBLICATIONS

U.S. Appl. No. 16/043,031, Office Action Summary, dated Oct. 29, 2020, pp. 1-12.

U.S. Appl. No. 15/974,478, Office Action Summary, dated Jan. 8, 2020, pp. 1-23.

S. Mohamed et al., "Visual Interfaces for High Level Hardware Synthesis", Proceedings of the working conference on Advanced visual interfaces, May 1998, pp. 277-279.

U.S. Appl. No. 14/727,517, Office Action Summary, dated Aug. 25, 2017, pp. 1-13.

U.S. Appl. No. 14/727,517, Office Action Summary, dated Jun. 21, 2017, pp. 1-24.

U.S. Appl. No. 14/727,544, Office Action Summary, dated Aug. 10, 2017, pp. 1-44.

U.S. Appl. No. 14/727,580, Office Action Summary, dated Aug. 10, 2017, pp. 1-28.

U.S. Appl. No. 14/727,598, Office Action Summary; dated Aug. 10, 2018, pp. 1-38.

U.S. Appl. No. 14/727,530, Office Action Summary, dated Oct. 2, 2017, pp. 1-34.

U.S. Appl. No. 14/727,555, Office Action Summary, dated Nov. 2, 2017, pp. 1-12.

U.S. Appl. No. 14/727,530, Office Action Summary, dated Feb. 9, 2018, pp. 1-21.

U.S. Appl. No. 14/727,517, Office Action Summary, dated Feb. 8, 2018, pp. 1-23.

U.S. Appl. No. 14/727,544, Office Action Summary, dated Feb. 8, 2018, pp. 1-21.

U.S. Appl. No. 14/727,580, Office Action Summary, dated Feb. 8, 2018, pp. 1-20.

U.S. Appl. No. 14/727,598, Office Action Summary, dated Feb. 8, 2018, pp. 1-21.

U.S. Appl. No. 14/727,555, Office Action Summary, dated Mar. 22, 2018, pp. 1-15.

* cited by examiner

140b

If (Condition_01) { ⟵ 172

174 { Computational_Statement_01;
Computational_Statement_02;
} else { ⟶ 172

Switch (Condition_02)

174 { Case 'Condition_02' :
Computational_Statement_03;
Computation_Statement_04;
Break;

174 { Case 'Condition_02' : ⟵ 172
Computational_Statement_05;
Computational_Statement_06;
Break; }

| Logic Transformation ID |
| 155 |
| Binary Output Variables |
| 225 |
| Next State Values |
| 230 |
| Input Data |
| 160 |
| Input Data |
| 160 |
| Input Data |
| 160 |

160

| Input ID |
| 165 |
| Binary Input Variable |
| 215 |
| Binary Input Variable |
| 215 |
| Binary Input Variable |
| 215 |

170

| Logic Element ID |
| 450 |
| Assertion Indicator |
| 295 |
| Assertion Value |
| 290 |

175

| Connection ID |
| 255 |
| Source Field |
| 260 |
| Destination Field |
| 265 |
| Field Assertion Indicator Data |
| 170 |

RISK EVALUATION

CROSS-REFERENCE TO RELATED APPLICATIONS

This is a continuation-in-part application of and claims priority U.S. patent application Ser. No. 14/727,530 entitle "RISK EVALUATION" and filed on Jun. 1, 2015 for M. David McFarland, which is incorporated herein by reference.

FIELD

The subject matter disclosed herein relates to risk evaluation.

BACKGROUND

Description of the Related Art

Events may be characterized with logical elements and logical element relationships. Unfortunately, these characterizations may become intractably complex.

BRIEF SUMMARY

A method for risk evaluation is disclosed. The method encodes event data as a linear array that includes a plurality of logic states. Each logic state represents a path between events of the event data, each logic state comprising one or more binary output variables, one or more binary input variables, one or more minterms of the one or more binary input variables, one or more maxterms of the one or more minterms, one or more present state values, and one or more next state values. The method estimates a success probability for each logic state and identifies path groups of the plurality of logic states, wherein the logic states of each path group must all be healthy for each logic state to contribute to system success. The method further identifies each path combination of path groups and path nodes that result in system success. In addition, the method calculates a system success probability as a sum of success probabilities for each path combination. The success rate for each path combination is calculated as a product of the path group success probabilities for the path combination. A program product and apparatus also perform the functions of the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 1C is a text diagram illustrating one embodiment of a source code logic design;

DETAILED DESCRIPTION

Figure 1A:
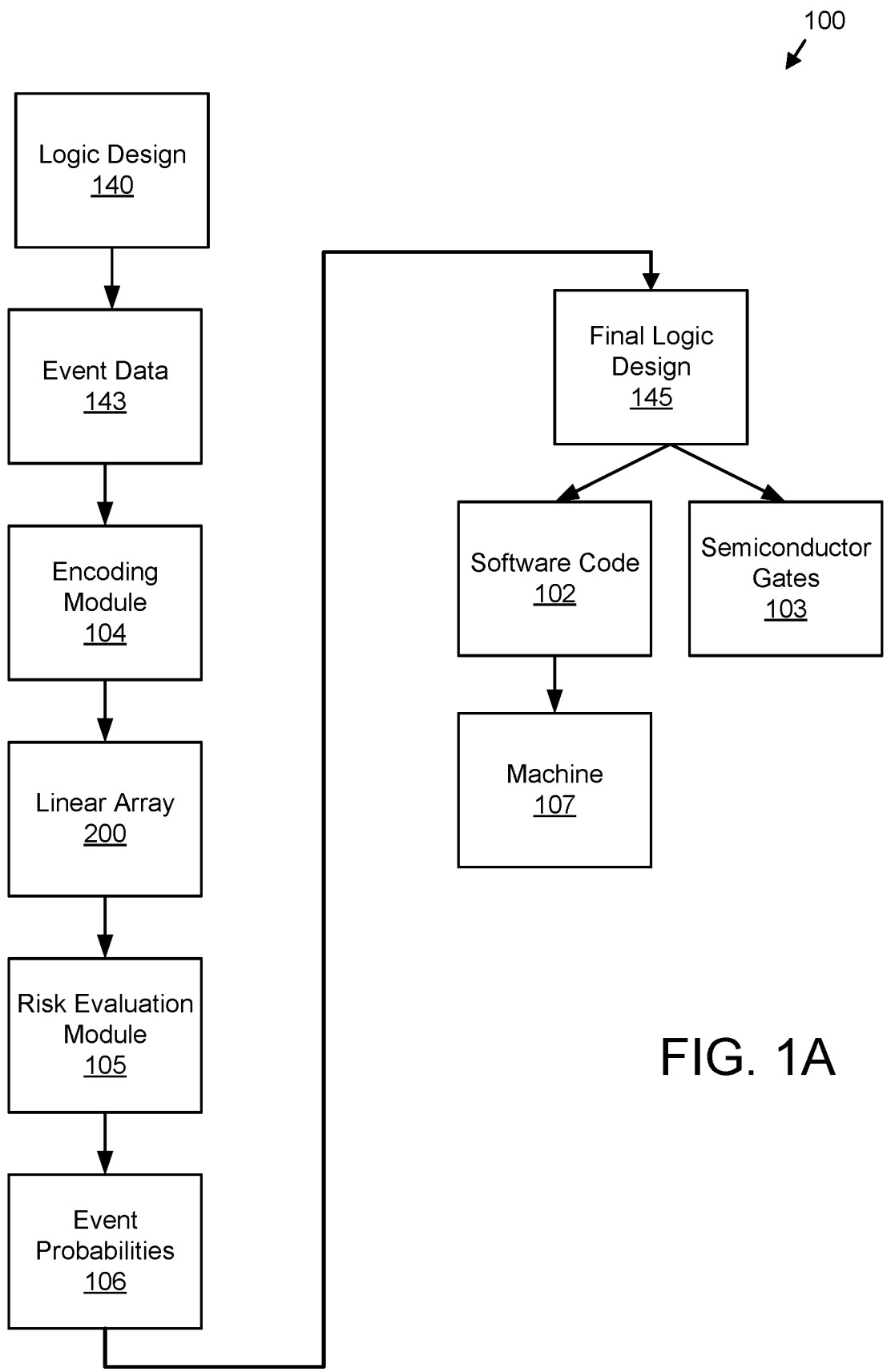
FIG. 1A is a schematic block diagram illustrating one embodiment of a path execution time generation process.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage medium storing machine readable code, computer readable code, and/or program code, referred hereafter as code. The computer readable storage medium may be tangible, non-transitory, and/or non-transmission. The computer readable storage medium may not embody signals. In a certain embodiment, the storage devices only employ signals for accessing code.

The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Ada, Python, Ruby, Java, Smalltalk, C++, or the like, and conventional procedural programming languages, such as the "C" programming language, SQL, relay ladder logic, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A is a schematic block diagram illustrating one embodiment of a risk evaluation process 100. In one embodiment, event data 143 is generated from a logic design 140. In the depicted embodiment, the encoding module 104 encodes event data 143 into a linear array 200. The event data 143 may describe conditions, preconditions, likelihoods, and estimations for one or more events. The events may be transactions in a semiconductor design.

The event data 143 typically specifies a plurality of inputs, conditions, actions, outputs, event states and/or decision flows, referred to hereinafter as logic elements. In addition, the event data 143 specifies some of the interactions between the logic elements.

Unfortunately, describing all of the possible interactions between the logic elements increasing exponentially with the number of logic elements, often resulting in the generation of a data structure of on the order of $2^N$ logic element relationships, where N is the number of logic elements. As a result, even for modest sets of event data 143, the event data 143 generates logic element relationships that are often intractably complex.

It may be desirable to analyze the event data 143 and determine probabilities for specific events occurring based on the other logical elements in the event data 143. Unfortunately, the complexity of the event data 143 often makes manipulating, analyzing, and resolving the event data 143 into event probabilities difficult.

In the embodiments described herein, the encoding module 105 encodes the event data 143 into a linear array 200. The linear array 200 reduces the complexity of the logic element relationships of the event data 143. As a result, a risk evaluation module 105 may more easily manipulate the logic element relationships and generate event probabilities 106 from the logic element relationships as will be described hereafter.

A final logic design 145 may be generated based on the event probabilities 106. In one embodiment, paths for the final logic design 145 may be generated from the linear array based on the success probabilities for each path combination as will be described hereafter.

In one embodiment, the final logic design 145 is implemented in software code 102. The software code 102 may implement the Boolean logic of the final logic design 145. The software code 102 may be compiled and/or executed on a machine 107 such as a semiconductor device 111. In addition, the final logic design 145 may be fabricated in semiconductor gates 103. The semiconductor gates 103 may implement the Boolean logic of the final logic design 145.

Figure 1B:
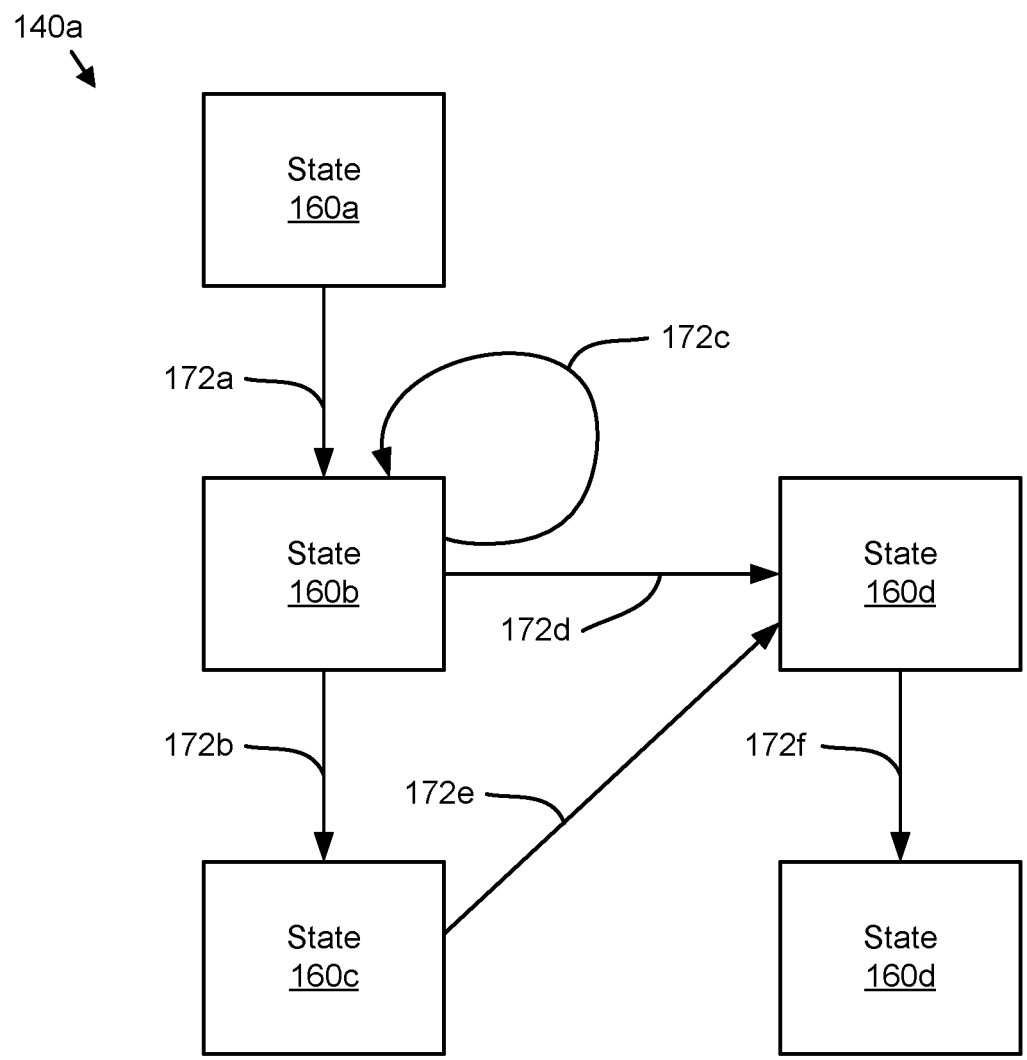
FIG. 1B is a schematic block diagram illustrating one embodiment of a state machine logic design.

FIG. 1B is a schematic block diagram illustrating one embodiment of a state machine logic design 140a. The state machine logic design 140a includes a plurality of states 160 and a plurality of conditional logic 172. Each state 160 may define one or more actions that are taken and/or actions that are not taken. In one embodiment, the conditional logic 172 specifies when to transition from state 160 to state 160.

FIG. 1C is a text diagram illustrating one embodiment of a source code logic design 140b. The source code logic design 140b includes conditional logic 172 that defines when various actions 174 are taken. In the depicted embodiment, the actions 174 are computational statements. The source code logic design 140b may be compiled to generate instructions for a processor or the like.

Figure 1D:
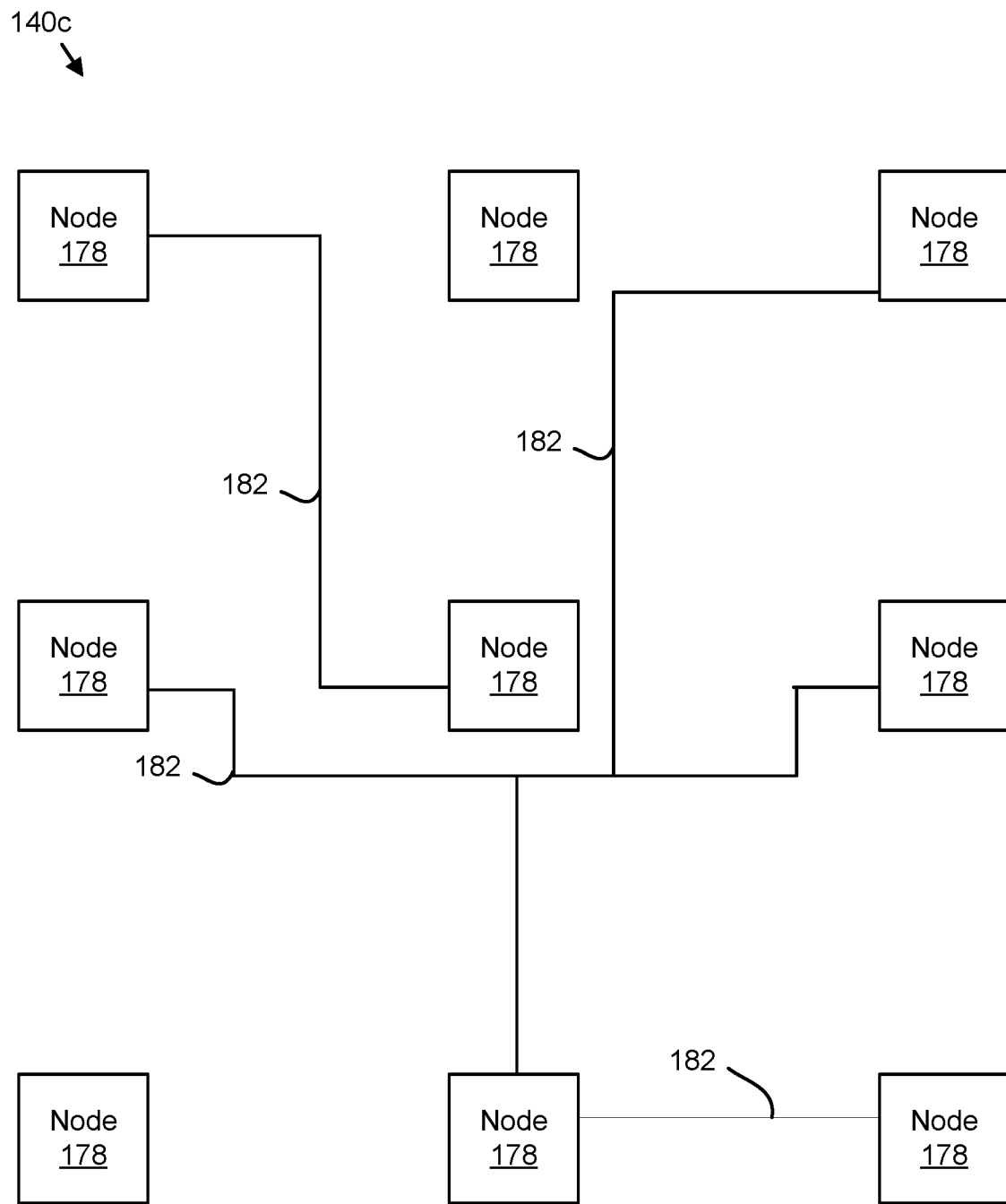
FIG. 1D is a schematic block diagram illustrating one embodiment of a net list logic design.

FIG. 1D is a schematic block diagram illustrating one embodiment of a net list logic design 140c. The net list logic design 140c defines a plurality of nodes 178. Functions of each node 178 are connected by paths 182. The paths 182 may include one or more programmable switches and one or more programmable buses.

In one embodiment, the paths 182 define the net list logic design 140c by defining the relationships between inputs, states, and outputs. The relationships may define conditional logic and actions that are performed in response to the conditional logic. In addition, the net list logic design 140c may include code that is executed by a processor and/or sequencer on a node 178. The logic design 140 may be the combination of the code for the nodes 178 and the organization of the paths 182.

Figure 1E:
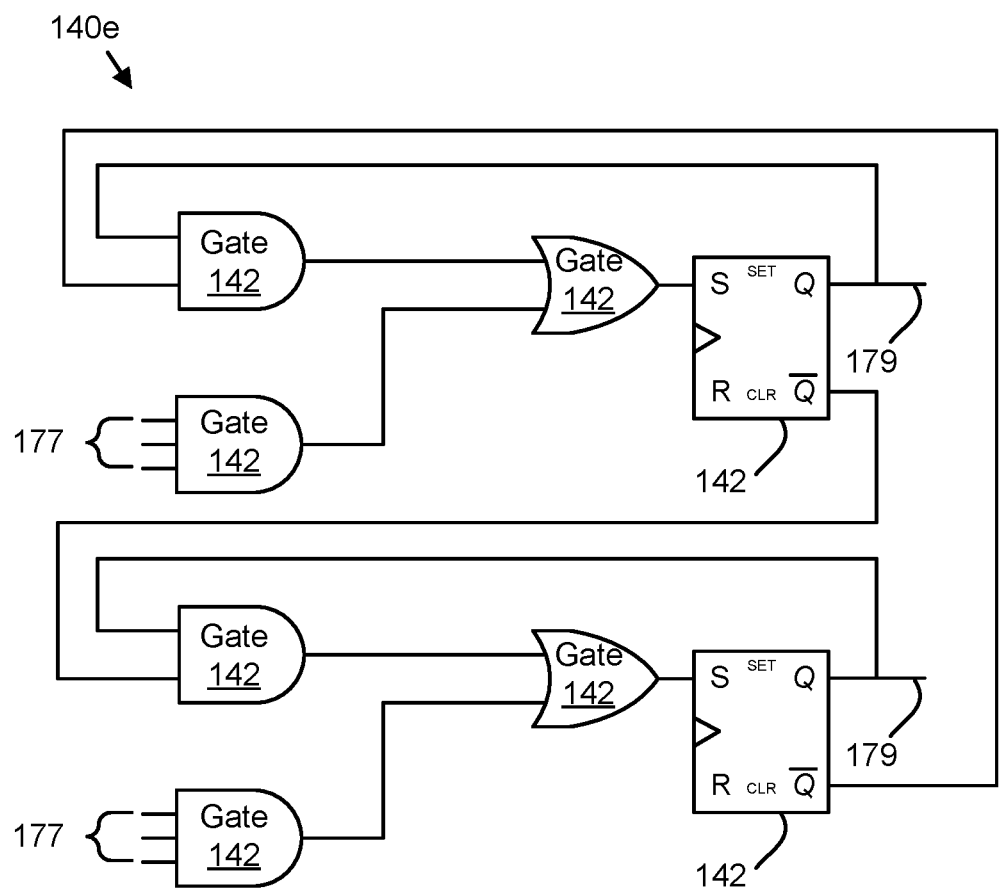
FIG. 1E is a schematic block diagram illustrating one embodiment of a combinatorial logic design.

FIG. 1E is a schematic block diagram illustrating one embodiment of a combinatorial logic design 140e. The combinatorial logic design 140e uses one or more logic gates 142 to generate binary outputs 179 from binary inputs 177.

Figure 1F:
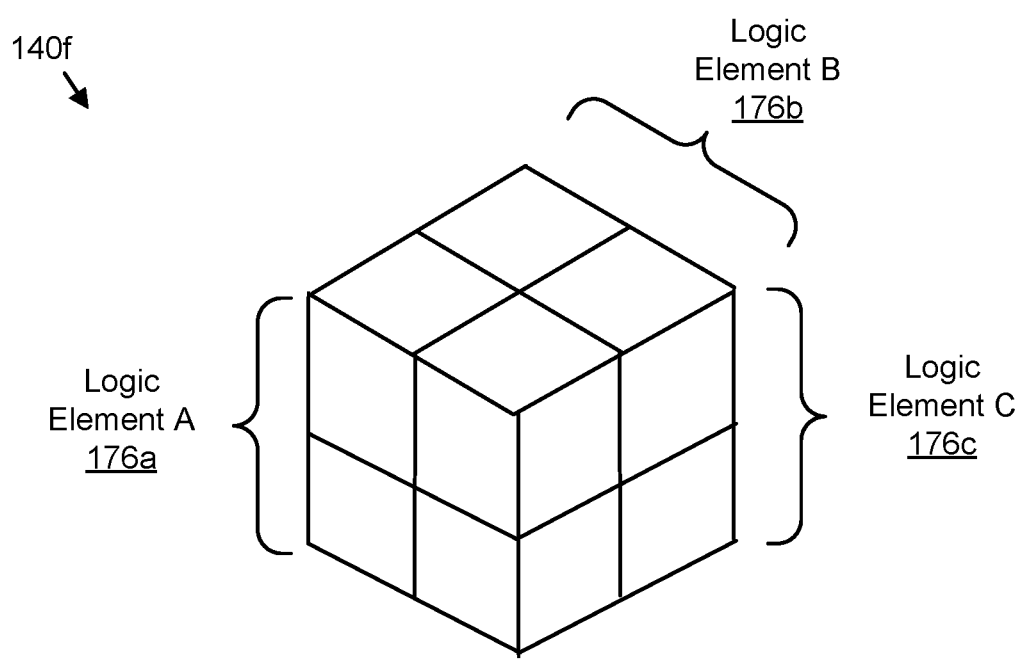
FIG. 1F is a drawing illustrating one embodiment of a multidimensional logical array.

FIG. 1F is a drawing illustrating one embodiment of a multidimensional logical array logic design 140f For simplicity, the multidimensional logical array logic design 140d is shown for three logic elements 176. As shown, the multidimensional logic array logic design 140f for only three logic elements 176 results in $2^N$ or 8 logic element relationships. For even modest logic designs 140, the number of logic element relationships quickly becomes intractable. The embodiments described herein encode logic designs 140 such as those illustrated FIGS. 1B-E into the linear array 200. The linear array 200 may be examined to identify and define undefined logic element relationships as will be described hereafter.

Figure 1G:
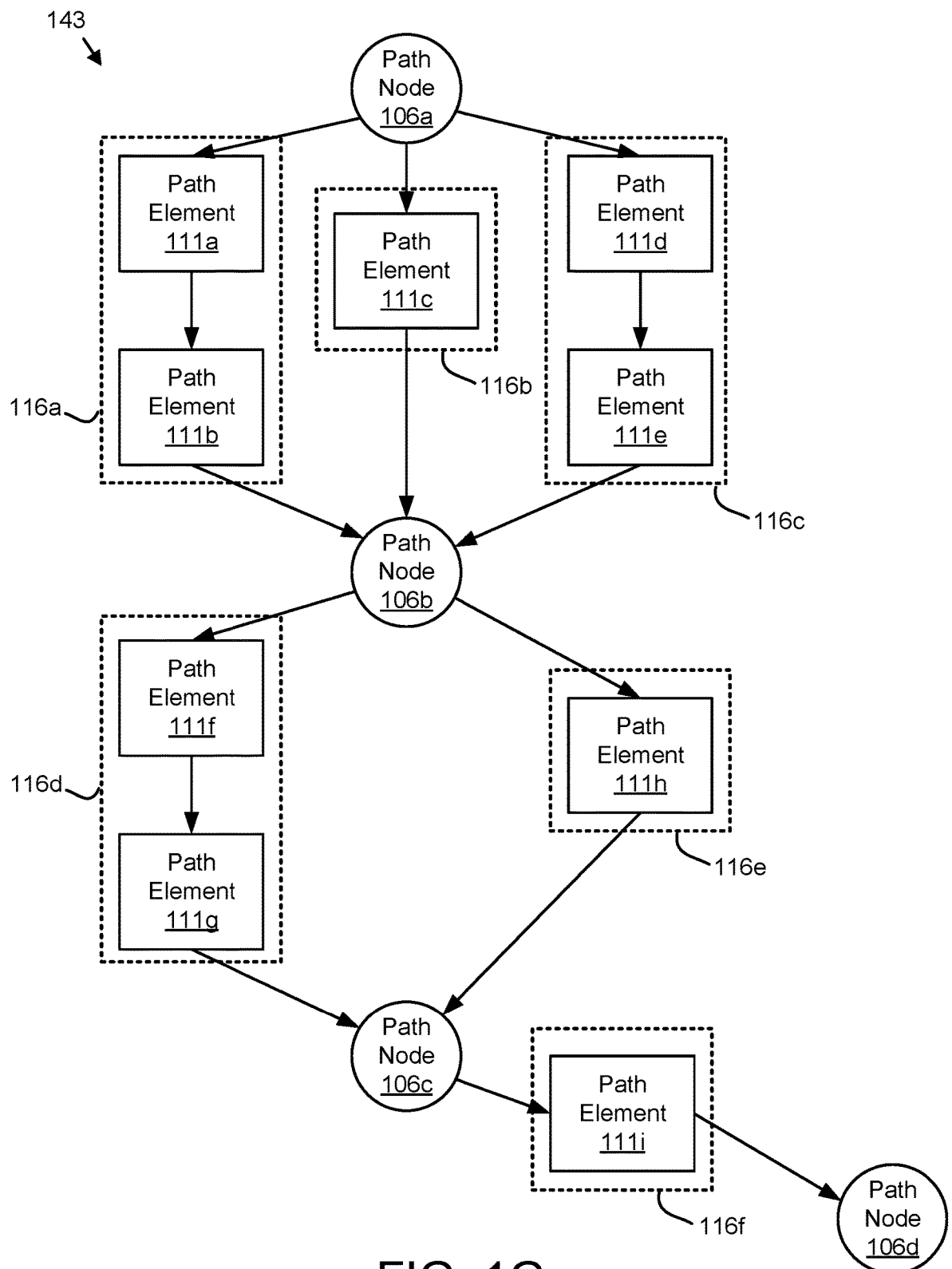
FIG. 1G is a flowchart diagram illustrating one embodiment of event data.

FIG. 1G is a flowchart diagram illustrating one embodiment of event data 143. In the depicted embodiment, the event data 143 is shown as a plurality of logic elements including path nodes 106 and path elements 111. Each path element 111 may represent an event. Each path node 106 may represent a milestone that is achieved upon the completion of one or more path elements 111.

A success probability may be associated with each path element 111. The success probability may be a range of probabilities. For example, the success probability may be a probability range of 5-25%. Alternatively, the success probability may be a scalar probability, such as 35%. In one embodiment, the success probability is represented by a Gaussian distribution. The Gaussian distribution may include a mean and a standard deviation.

The success probability of achieving the milestone of path node 106b from the start of the milestone of path node 106a depends on a number of independent and dependent path elements 111. For example, path node 106b may be achieved if both path element 111a and path element 111b are achieved. However, path node 106b may also be achieved if path element 111c is successfully achieved, regardless of whether path element 111a or path element 111b are achieved. In addition, path node 106b may also be successfully achieved if both path element 111d and path element 111e are achieved, regardless of whether path element 111a, path element 111b, or path element 111c are successfully achieved.

A path element 111 or path node 106 that is successfully achieved may also be referred to as healthy. A path group 116 comprises path elements 111 and path nodes 106 that all must be healthy for the path group 116 to be healthy.

However, if one path element 111 or path node 106 in the path group are unhealthy, the path group 116 is also unhealthy.

For example, path element 111*a* and path element 111*b* form a path group 116. Both path element 111*a* and path element 111*b* must be healthy for either path element 111*a* or path element 111*b* to contribute to system success. Path groups 116 may have any number of path elements 111.

A success probability can be calculated for each path group 116. In one embodiment, the success probability for a path group 116 is the product of success probabilities for each path element 111 wherein the success probability of each path element 111 is independent of each other path element 111.

Alternatively, the path elements 111 in a path group 116 may be interdependent. The success probability for the path group 116 may be calculated as a function of the success probability of each path element 111 and the interdependence of the path elements 111.

Figure 2A:
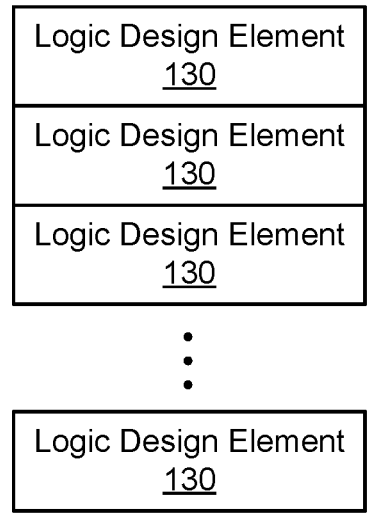
FIG. 2A is a schematic block diagram illustrating one embodiment of a logic design.

FIG. 2A is a schematic block diagram illustrating one embodiment of a logic design 140. The logic design 140 may be organized as a data structure in a memory. The logic design 140 includes a plurality of logic design elements 130. Each logic design element 130 may include one or more logic elements 176 and/or one or more logic element relationships.

The logic design 140 maybe organized as a flat file comprising source code, Boolean descriptions, logical relationships, state relationships, and the like. Each logic design element 130 may be a line or other logical division of the file. Alternatively, the logic design 140 may be organized as a net list that specifies one or more nodes 178 and one or more paths 182 between the nodes 178. Each logical design element 130 may define a path 182. In one embodiment, the logical design 140 includes data structures that define functions performed at each node 178.

In one embodiment, the logic design elements 130 define logic gates 142, binary outputs 179, and/or binary inputs 177. Alternatively, the logic design elements 130 may define states 160, conditional logic 172, actions 174, or combinations thereof.

Figure 2B:
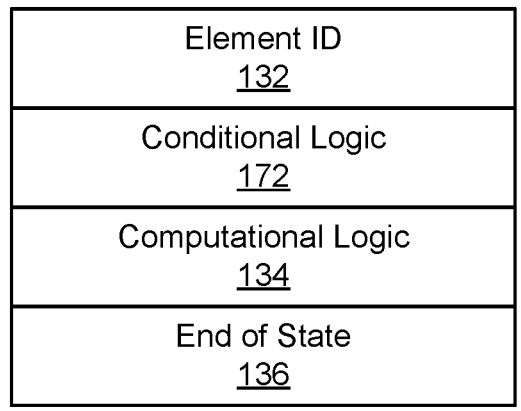
FIG. 2B is a schematic block diagram illustrating one embodiment of a logic design element.

FIG. 2B is a schematic block diagram illustrating one embodiment of a logic design element 130. The logic design element 130 may be organized as a data structure in a memory. Each logic design element 130 may be parsed from the logic design 140. In the depicted embodiment, the logic design element 130 includes an input identifier 132, conditional logic 172, computational logic 134, and an end of state 136.

The element identifier 132 may uniquely identify the logic design element 130. The element identifier 132 includes a file name. In addition, the element identifier 132 may comprise a range of line numbers for a text file, a data structure reference number, or combinations thereof.

The conditional logic 172 may define conditions that must be satisfied in order to execute the computational logic 134. In addition, the conditional logic 172 may define an element identifier 132 if the conditions are not satisfied in order to execute the computational logic 134. In one embodiment, the conditional logic 172 is always performed if another logic design element 130 branches to the current element identifier 132. In one embodiment, the conditional logic 172 includes one or more of nodes 178, paths 182, logic gates 142, binary outputs 179, binary inputs 177, states 160, and actions 174.

The computational logic 134 may specify actions 174 that are performed if the conditional logic 172 is satisfied. The actions 174 may include one or more computational statements. Alternatively, the actions 174 may include one or more of nodes 178, paths 182, logic gates 142, binary outputs 179, binary inputs 177, and states 160. In addition, the computational logic 134 may assert and/or deassert one or more binary output variables and/or one or more next state values. The end of state 136 may indicate an end of the conditional logic 172 and the computational logic 134 associated with the element identifier 132.

Figure 2C:
FIG. 2C is a schematic block diagram illustrating one embodiment of a logic transformation.

FIG. 2C is a schematic block diagram illustrating one embodiment of a logic transformation 150. The logic transformation 150 may be generated from the logic design element 130. The logic transformation 150 maybe organized as a data structure in a memory. In the depicted embodiment, the logic transformation 150 includes a logic transformation identifier 155, binary output variables 225, next state values 230, and input data 160.

The binary output variables 225 maybe control signals such as binary outputs 179. In addition, the binary output variables 225 may identify data structures such as numerical values, alphanumeric values, logical values, dates, times, and the like. In one embodiment, the logic design element 130 is parsed to identify each binary output variable 225 from the computational logic 134.

The next state values 230 may define logical states. In one embodiment, the next state values 230 comprise an element identifier 132 for a logic design element 130. In addition, the next state values 230 may include one or more binary state values as will be described hereafter.

The input data 160 may define inputs that generate the binary output variables 225 and the next state values 230. In one embodiment, input data 160 is generated for each binary output variable 225 and each next state value 230.

Figure 2D:
FIG. 2D is a schematic block diagram illustrating one embodiment of input data.

FIG. 2D is a schematic block diagram illustrating one embodiment of input data 160. The input data 160 maybe organized as a data structure in a memory. In the depicted embodiment, the input data 160 includes an input identifier 165 and a plurality of binary input variables 215.

The input identifier 165 may uniquely identify the input data 160. The binary input variables 215 may be control signals such as binary inputs 177. Alternatively, the binary input variables 215 may identify data structures such as numerical values, alphanumeric values, logical values, dates, times, and the like.

Figure 2E:
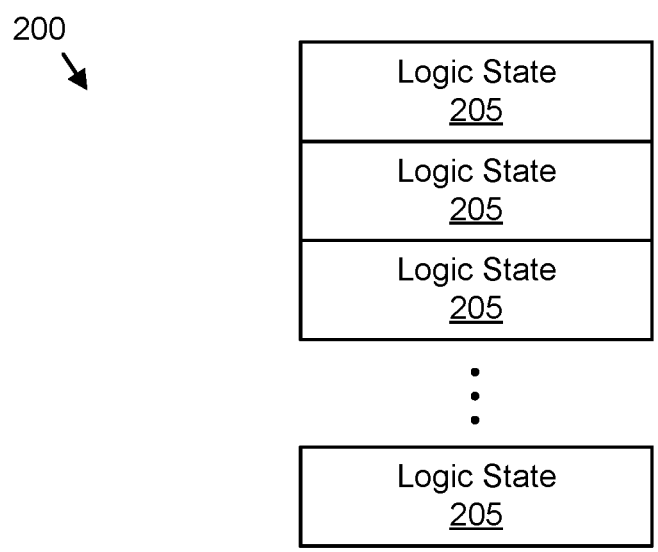
FIG. 2E is a schematic block diagram illustrating one embodiment of a linear array.

FIG. 2E is a schematic block diagram illustrating one embodiment of a linear array 200. The linear array 200 may be generated from the logic transformation 150. The linear array 200 maybe organized as a data structure in a memory. The linear array 200 includes a plurality of logic states 205.

Figure 2F:
FIG. 2F is a schematic block diagram illustrating one embodiment of a logic state.

FIG. 2F is a schematic block diagram illustrating one embodiment of a logic state 205. The logic state 205 maybe organized as a data structure in a memory. The logic state 205 includes a logic state identifier 210, one or more binary input variables 215, one or more binary output variables 225, one or more next state values 230, one or more present state values 220, one or more maxterms 235, one or more minterms 240, and a state transitions value 343.

The logic state identifier 210 may uniquely identify the logic state 205. The logic state identifier 210 may include a label, a mnemonic, or the like. In addition, the logic state identifier 210 may include a corresponding logic transformation identifier 155 for the logic transformation 150 that corresponds to the logic state 205.

The binary output variables 225 may include each binary output variable 225 from the logic design 140. Alternatively, the binary output variables 225 may include each binary output variable 225 identified for the corresponding logic transformation 150. In one embodiment, each binary output variable 225 is assigned an identifier such as a label, a logical representation, an index value, or the like.

The binary input variables 215 may include each binary input variable 215 from the logic design 140. In addition, the binary input variables 215 may include each binary input variable 215 identified for the corresponding logic transformation 150. NOT logic 340 may be associated with each binary input variable 215. The NOT logic 340 indicates whether an inverse of the binary input variable 215 is asserted. In one embodiment, each binary input variable 215 is assigned an identifier such as a label, a logical representation, an index value, or the like.

The present state values 220 may be binary values that uniquely define the logic state 205 as a binary value. The present state values 220 may uniquely describe the logic state identifier 210. The present state values 220 for each logic state 205 may be associated with a logic transformation identifier 155. In one embodiment, the present state values 220 may be selected reduce the complexity of the logic design 140. In one embodiment, each present state value 220 is assigned an identifier such as a label, a logical representation, an index value, or the like.

The next state values 230 may define one or more next states that are branched to as a function of the binary input variables 215. The next state values 230 may be a binary encoding of the next state values 230 of the logic transformation 150. In one embodiment, each next state value 230 is assigned an identifier such as a label, a logical representation, an index value, or the like.

Each minterm 240 may be a binary product or logical AND of one or more binary input variables 215 and/or one or more present state values 220. Alternatively, each minterm 240 may be a binary product of one or more maxterms 235. In one embodiment, each minterm 240 is assigned an identifier such as a label, a logical representation, an index value, or the like.

Each maxterm 235 may be a binary sum or logical OR of one or more minterms 240. Alternatively, each maxterm 235 may be a binary sum of one or more binary input variables 215 and/or one or more present state values 220. In one embodiment, each maxterm 235 is assigned an identifier such as a label, a logical representation, an index value, or the like.

The state transitions value 343 may record a number of state transitions that have been traversed from a current logic state 205 to subsequent logic states 205. A state transition transitions active control from the current logic state 205 to a subsequent logic state 205. For example, the current logic state 205 STATE00 may transition active control of a device or computer to subsequent state 205 STATE01.

In one embodiment, the state transitions value 343 is incremented each time a state transition from the current logic state 205 is traversed. Alternatively, the state transitions value 343 records a total number of state transitions from the current logic state 205 to subsequent logic states 205.

The plurality of logic states 205 in the linear array 200 represents the multidimensional array of the logic design 140 in a form that is more easily manipulated and analyzed. As a result, logic element relationships may be identified, analyzed, and resolved as will be described hereafter.

Figure 2G:
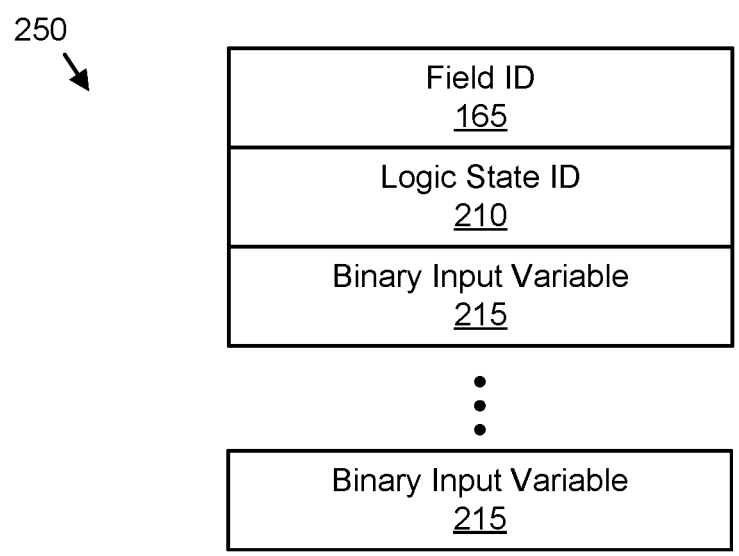
FIG. 2G is a schematic block diagram illustrating one embodiment of field data.

FIG. 2G is a schematic block diagram illustrating one embodiment of field data 250. The field data 250 describes a field in the combination map. The field data 250 maybe organized as a data structure in a memory. In the depicted embodiment, the field data 250 includes a field identifier 165, one or more logic state identifiers 210, and one or more binary input variables 215.

The field identifier 165 may uniquely identify the field in the combination map. The logic state identifier 210 may identify a logic state 205 associated with the field. Each field may represent at least one single logic state 205. The binary input variables 215 may indicate which of the binary input variables 215 for the logic state 205 is associated with the field.

Figure 2H:
FIG. 2H is a schematic block diagram illustrating one embodiment of assertion indicator data.

FIG. 2H is a schematic block diagram illustrating one embodiment of assertion indicator data 170. The assertion indicator data 170 may indicate whether a logic element 176 is asserted. The assertion indicator data 170 may be organized as a data structure in a memory. In the depicted embodiment, the assertion indicator data 170 includes a logic element identifier 450, an assertion indicator 295, and an assertion value 290.

The logic element identifier 450 associates the assertion indicator data 170 with a logic element 176. The assertion value 290 specifies whether binary input variables 215, present state values 220, minterms 240, maxterms 235, binary output variables 225, next state values 230, state values 315 and other logic elements 176 are asserted, deasserted, a DON'T CARE, undefined, or unknown.

In one embodiment, the assertion indicator 295 is of an indicator type selected from the group consisting of a color, a label, an arrow, an icon, hashing, and motion. For example, the indicator type may be a color with blue indicating that a field is asserted and read indicating that the field is deasserted.

Figure 2I:
FIG. 2I is a schematic block diagram illustrating one embodiment of connection data.

FIG. 2I is a schematic block diagram illustrating one embodiment of relationship arrow data 175. The relationship arrow data 175 may define a relationship arrow between fields of the combination map as will be described hereafter. The relationship arrow data 175 maybe organized as a data structure in a memory. In the depicted embodiment, the relationship arrow data 175 includes a connection identifier 255, a source field 260, a destination field 265, and the assertion indicator data 170.

The connection identifier 255 uniquely identifies a connection between the source field 260 and the destination field 265. The connection identifier 255 may be a label, an index, or the like.

The source field 260 may identify a first field that defines a first logical element relationship. The destination field 265 may identify one or more second fields that have second logical element relationships that include the first logical element relationship. For example, the source field 260 may define a first binary input variables 215 that are included the minterms 240 of the destination field 265. The destination field 265 may be a combination map. The assertion indicator data 170 may indicate if the source field 260 and/or the connection between the source field 260 and the destination field 265 are asserted.

Figure 2J:
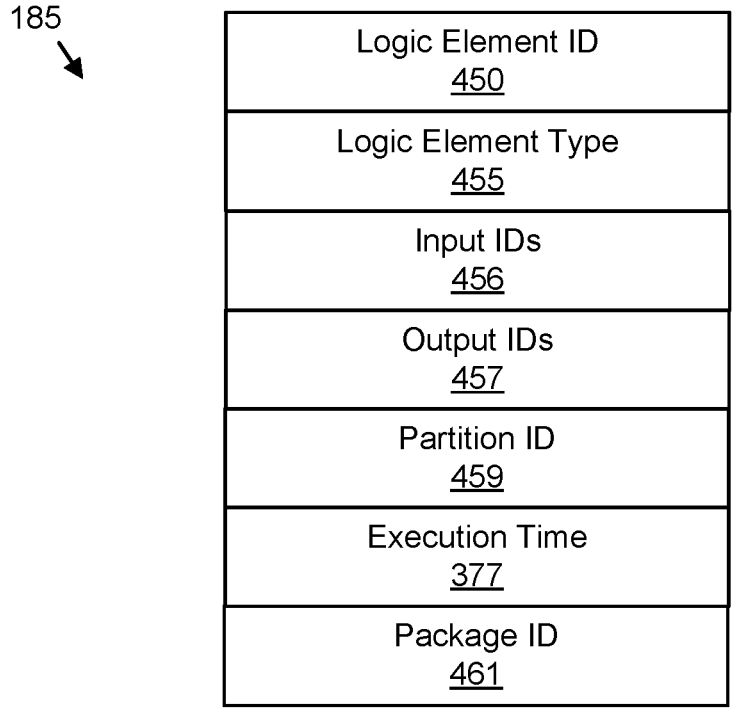
FIG. 2J is a schematic block diagram illustrating one embodiment of logic element data.

FIG. 2J is a schematic block diagram illustrating one embodiment of logic element data 185 for a logic element 176. The logic element data 185 maybe organized as a data structure in memory. In the depicted embodiment, the logic element data 185 includes a logic element identifier 450, a logic element type 455, one or more input identifiers 456, one or more output identifiers 457, a partition identifier 459, an execution time 377, and a package identifier 461.

The logic element identifier 450 may uniquely identify the logic element. The logic element identifier 450 may be a label, an index, or the like.

The logic element type 455 may specify a type such as a binary input variable 215, a binary output variable 225, the minterm 240, a maxterm 235, a present state value 220, a next state value 230, not logic 340, a state transition between logic states 205, and the like. Alternatively, the logic element type 455 may specify a logic state 205, a state 160, a software variable, conditional logic 172, computational logic 134, an action 174, a node 178, a path 182, or the like.

The input identifiers 456 may list the logic element identifiers 450 of inputs such as binary inputs 177 to the logic element. The output identifiers 457 may list the logic element identifiers 450 of logic elements receiving outputs from the logic element.

The partition identifier 459 may specify a partition that the logic element is assigned to. A partition may be a device design, hardware design elements for a device, software design elements for a device, or the like. For example, the partition identifier 459 may specify the logic element 176 is assigned to a software design partition. Alternatively, the partition identifier 459 may specify that the logic element 176 is assigned to a hardware design partition.

The execution time 377 may specify one or more of a minimum time for a state transition, a maximum time for a state transition, an average time for a state transition, a mean time for a state transition, a medium time for a state transition, the simulation generated time for a state transition, or the like.

The package identifier 461 may specify a destination package for the logic element. The destination package may be a defined package or a computational package. The defined package and the computational package may be used to validate the linear array 200.

Figure 2K:
FIG. 2K is a schematic block diagram illustrating one embodiment of probability data.

FIG. 2K is a schematic block diagram illustrating one embodiment of probability data 187. The probability data 187 may associate success probabilities 425 with the logic state 205. The probability data 187 maybe organizes a data structure and stored in a memory. In the depicted embodiment, the probability data 187 includes the logic state identifier 210, a success probability 425, interdependent relationships 430, and a note flag 435.

The logic state identifier 210 identifies the logic state 205 associated with the probability data 187. The success probability 425 estimates the probability of success for the logic state 205. The success probability 425 may be a range of probabilities, a scalar probability, a probability function, or combinations thereof.

The interdependent relationships 430 may specify relationships with other logic states 205 that modify the success probability 425. In one embodiment, the interdependent relationships 430 reflects causal relationships between the logic state's 205. Alternatively, the interdependent relationships 430 may reflect correlation between the logic states 205.

The note flag 435 may be set to indicate that the associated logic state 205 is a path node 106. If the note flag 435 is not set, the associated logic state 205 may be a path element 111.

Figure 2L:
FIG. 2L is a schematic block diagram illustrating one embodiment of path group data.

FIG. 2L is a schematic block diagram illustrating one embodiment of path group data 188. The path group data 188 may define a path group 116 of a plurality of logic states 205. The path group data 188 maybe organizes a data structure in memory. In the depicted embodiment, the path group data 188 includes a path group identifier 424, the success probability 425, the interdependent relationships 430, and one or more logic state identifiers 210.

The path group identifier 424 may uniquely identify a path group 116 associated with the path group data 188. The path group identifier 424 may be an index. In addition, the path group identifier 425 may include a label that identifies the path group 116.

The logic state identifiers 210 identify each logic state 205 that is included in the path group 116. In one embodiment, each logic state 205 may be included in one and only one path group 116.

The interdependent relationships 430 may specify the relationship of the path group 116 with other path groups 116, path elements 111, and path nodes 106. The success probability 425 for the path group 116 may be calculated as a function of the success probabilities 425 for each logic state 205 in the path group 116 and the interdependent relationships 430.

Figure 2M:
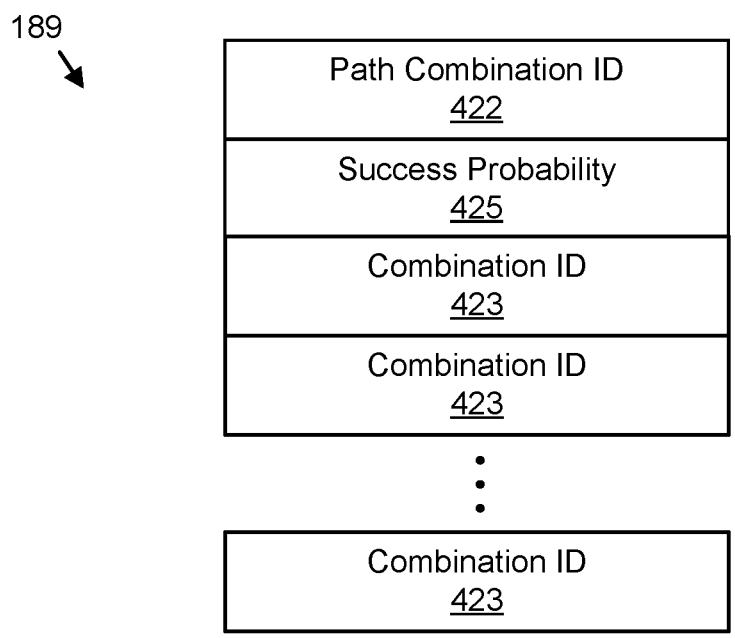
FIG. 2M is a schematic block diagram illustrating one embodiment of a path combination.

FIG. 2M is a schematic block diagram illustrating one embodiment of the path combination 189. The path combination 189 may identify one or more path groups 116 and/or path nodes 106 that results in system success. The path combination 189 maybe organizes a data structure in memory. In the depicted embodiment, the path combination 189 includes a path combination identifier 422, a success probability 425, and one or more combination identifiers 423.

The path combination identifier 422 may uniquely identify the path combination 189. The path combination identifier 422 may be an index. In addition, the path combination identifier 422 may include a label.

The success probability 425 records the probability of success for the path combination 189. Each combination identifier 423 is one of the path group identifier 424 four path group 116 and the logic state identifier 210 for a path node 106. The combination identifiers 423 identify the path groups 116 in path nodes 106 of the path combination 189.

Figure 3A:
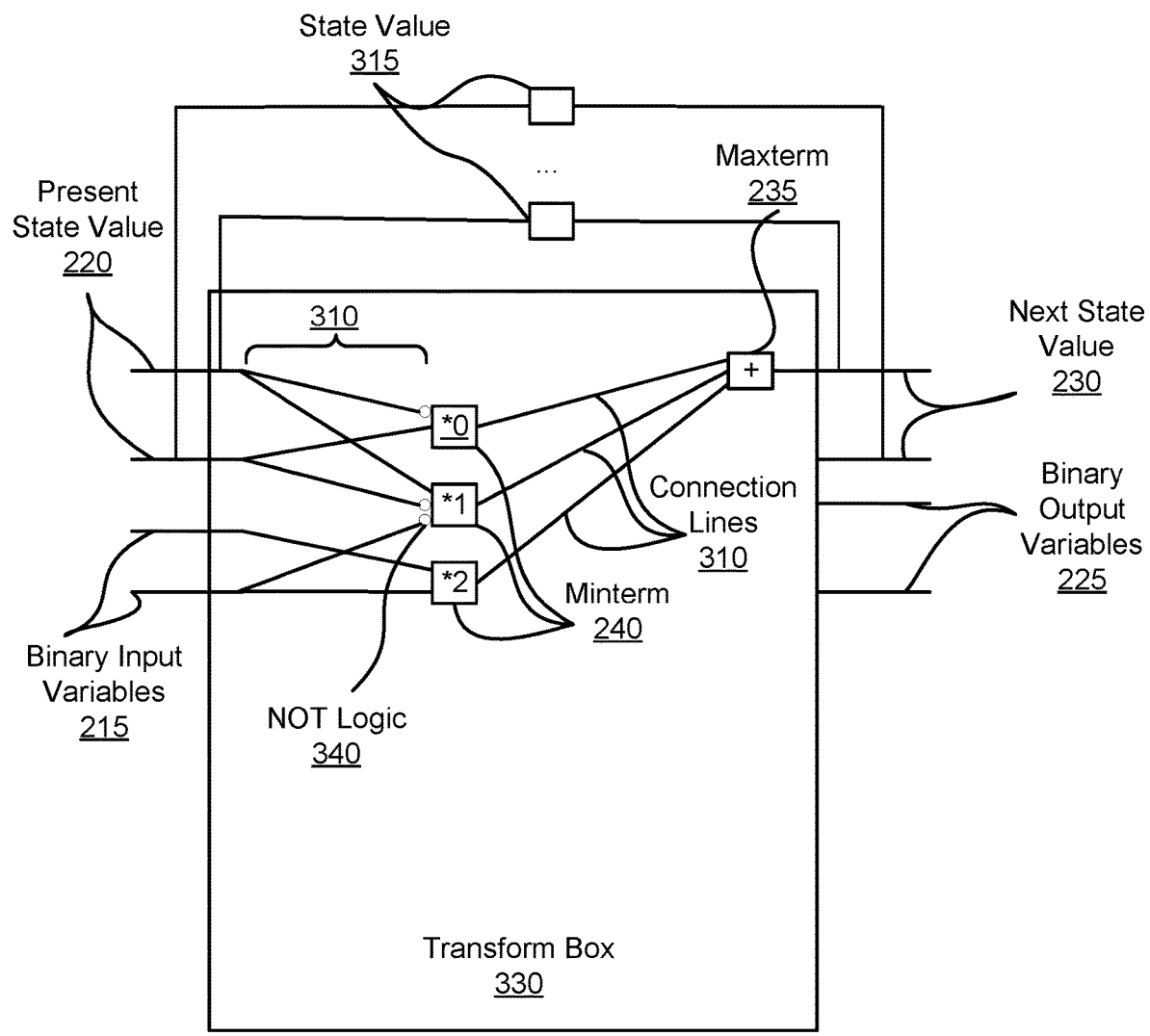
FIG. 3A is a schematic block diagram illustrating one embodiment of a transform box.

FIG. 3A is a schematic block diagram illustrating one embodiment of a transform box 330. The transform box 330 represents one or more logic states 205 as combinatorial logic. The transform box 330 allows undefined logic element relationships to be identified and resolved. Each transform box 330 may be associated with at least one logic state 205 and the field data 250 for the at least one logic state 205. The transform box 330 may be presented as a graphical user interface (GUI) on display. The elements of the transform box 330 may be manipulated by user. In the depicted embodiment, the elements of the transform box 330 include state values 315, the present state values 220, the next state values 230, the binary input variables 215, the NOT logic 340, one or more minterms 240, and one or more maxterms 235. In the depicted embodiment, the transform box 330 shows sum of products logic. Alternatively, the transform box 330 may display product of sums logic.

In one embodiment, only one maxterm 235 is displayed at a given time. Alternatively, each maxterm 235 for the logic state 205 may be displayed at a given time. Each maxterm 235 is represented as a logical sum of one or more minterms 240. Each maxterm 235 defines one or more of a next state value 230 and a binary output variable 225. Alternatively, only one minterm 240 may be displayed for product of sums logic.

Each minterm 240 may be displayed as a function of one or more binary input variables 215 and the NOT logic 340 associated with the binary input variables 215. In addition, each minterm 240 may be displayed as a function of the present state values 220.

The state values 315 may indicate previous next state values 230 that define the present state values 220. The next state values 230 define a next logic state 205. The binary output variables 225 define the actions 174 of the logic state 205.

Connection lines 310 may show the logical relationship of the binary input variables 215 and present state values 220 to minterms 240 and NOT logic 340. In addition, the connection lines 310 may show the logical relationship of the minterms 240 to the maxterms 235. Assertion indicator data 170 may define an assertion value for each connection line 310. A Boolean expression may be derived from the connection lines 310, binary input variables 215, present state values 220, NOT logic 340, minterms 240, and maxterms 235.

In one embodiment, a user may modify a logic state 205 by editing the displayed present state values 220, binary input variables 215, NOT logic 340, minterms 240, maxterms 235, next state values 230, binary output variables 225, and connection lines 310.

Figure 3B:
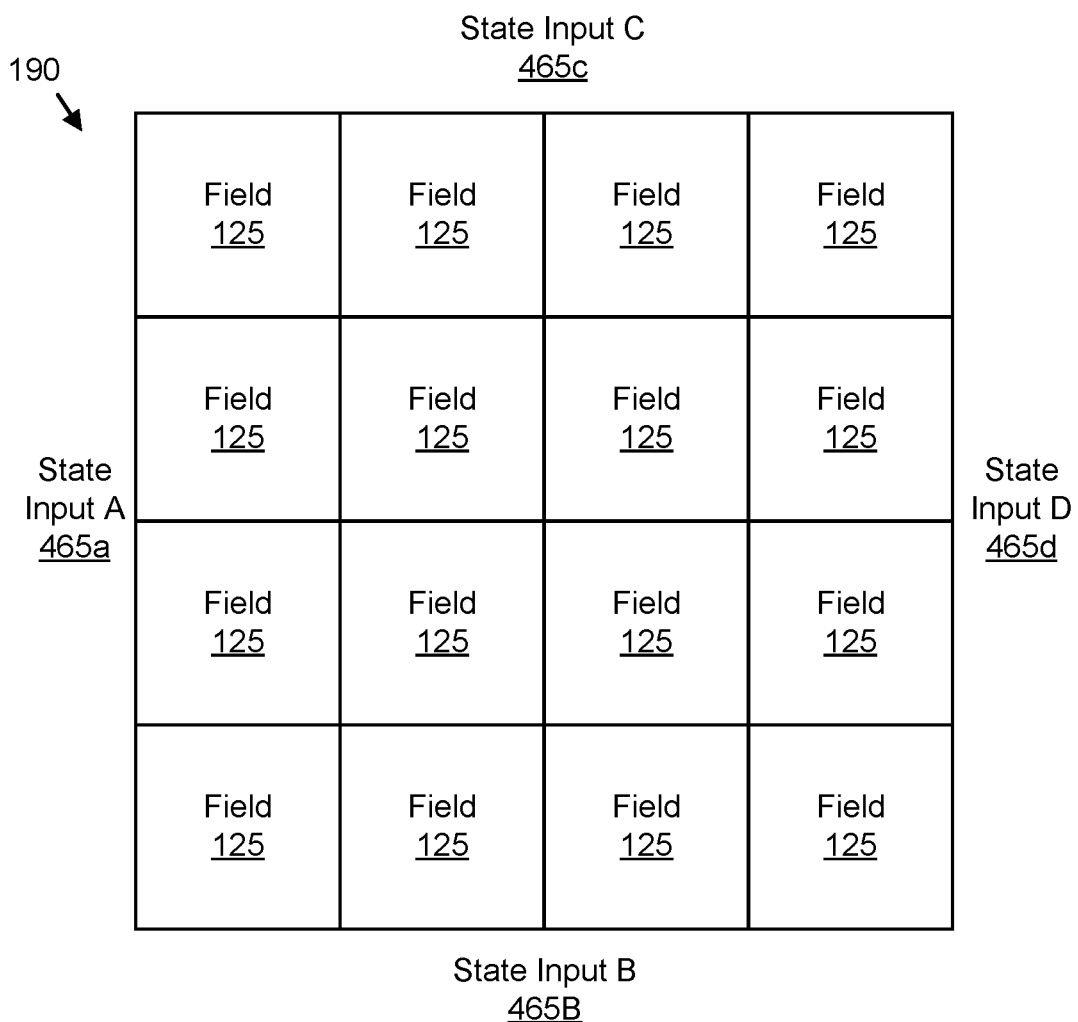
FIG. 3B is a drawing illustrating one embodiment of a combination map.

FIG. 3B is a drawing illustrating one embodiment of a combination map 190. In the depicted embodiment, fields 125 are shown for four state inputs 465. Each state input 465 is one of a binary input variable 215 and a present state value 220. Each field 125 is associated with unique field data 250. Each field 125 may represent a logic state 205. Alternatively, each field 125 may represent a plurality of binary input variables 215 as will be shown in FIG. 3D.

In one embodiment, state inputs 465 are automatically organized into the plurality of fields 125. For example, present state values 220 may be assigned to fields of higher level combination maps 190 while binary input variables 215 may be assigned to lower level combination maps 190. In addition, binary input variables 215 that defined in for a larger number of minterms 235 may be assigned to higher level combination maps 190. In one embodiment, binary input variables 215 that are defined with differing assertion values 290 for a larger number of minterms 235 are assigned to higher level combination maps 190.

Figure 3C:
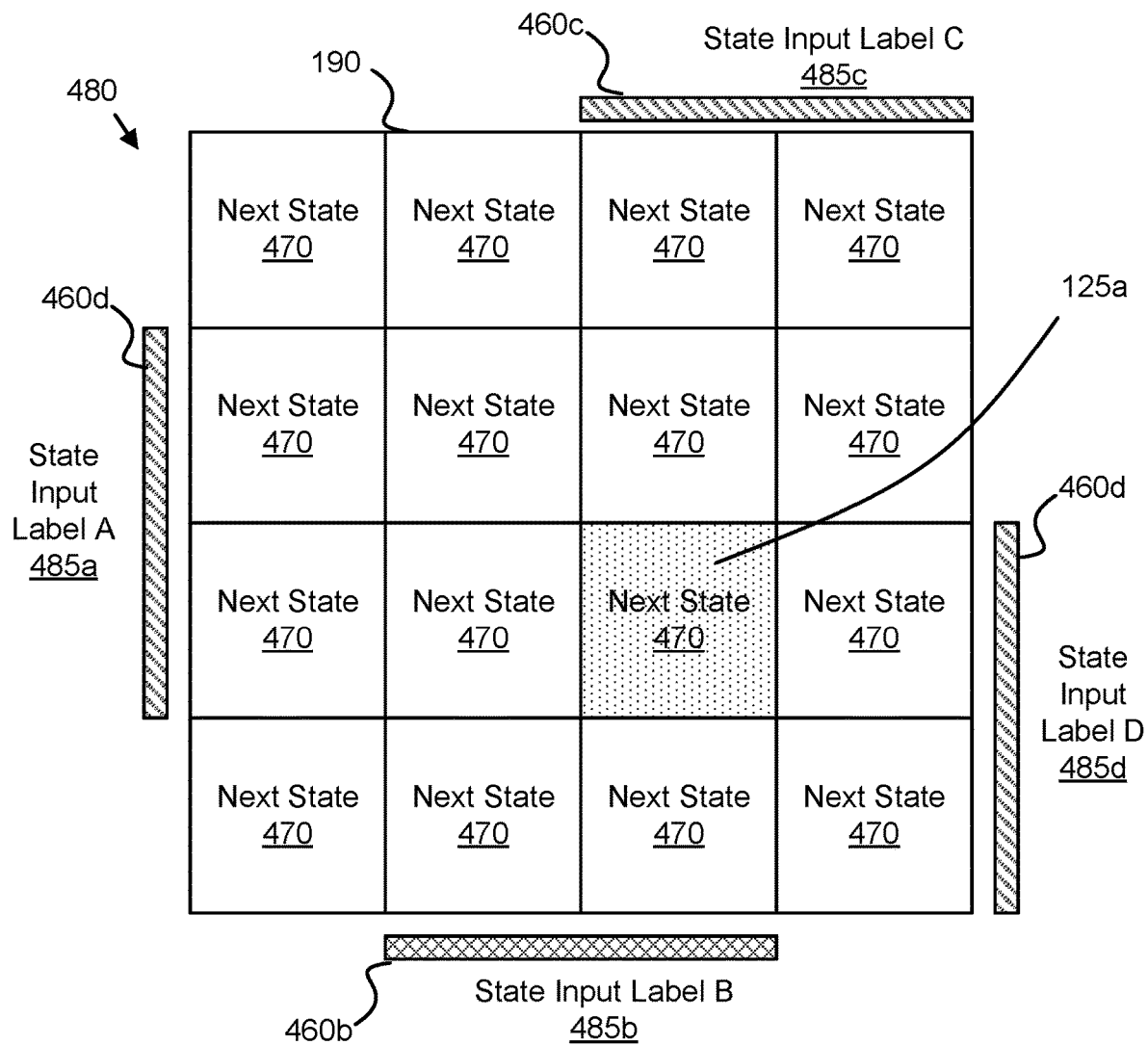
FIG. 3C is a drawing illustrating one embodiment of a combination map display.

FIG. 3C is a drawing illustrating one embodiment of a combination map display 480. A combination map 190 is displayed to the user such as on the display of a computer. State input labels 485 are shown for each state input 465 of FIG. 3B. Assertion bars 460 indicate whether each state input 465 is asserted or deasserted. Each field 125 of FIG. 3B displays a next state 470 if the state inputs 465 for the field 125 are asserted. The next state 470 may be next state values 230, a logic state identifier 210, or combinations thereof. Alternatively, the next state 470 may indicate another combination map 190 with binary input variables 215 that determine if the field 125 is asserted.

If the state inputs 465 indicated by the state input labels 485 are present state values 220, each field 125 may represent a logic state 205. A user may be prompted to enter a logic state identifier 210 for each logic state 205.

In addition, each field 125 may define an assertion value for the one or more binary output variables 225. The user may be prompted to define the assertion value 290 of a binary output variable 225 for each field 125 and/or each logic state 205.

In the depicted embodiment, a first field 125a is defined as asserted as a result of each the state inputs 465 identified by the state input labels 485 being asserted. As a result, upon completion of the logic state 205 defined by the present state values 220, the next state values 230 associated with the next state 470 will be asserted.

Figure 3D:
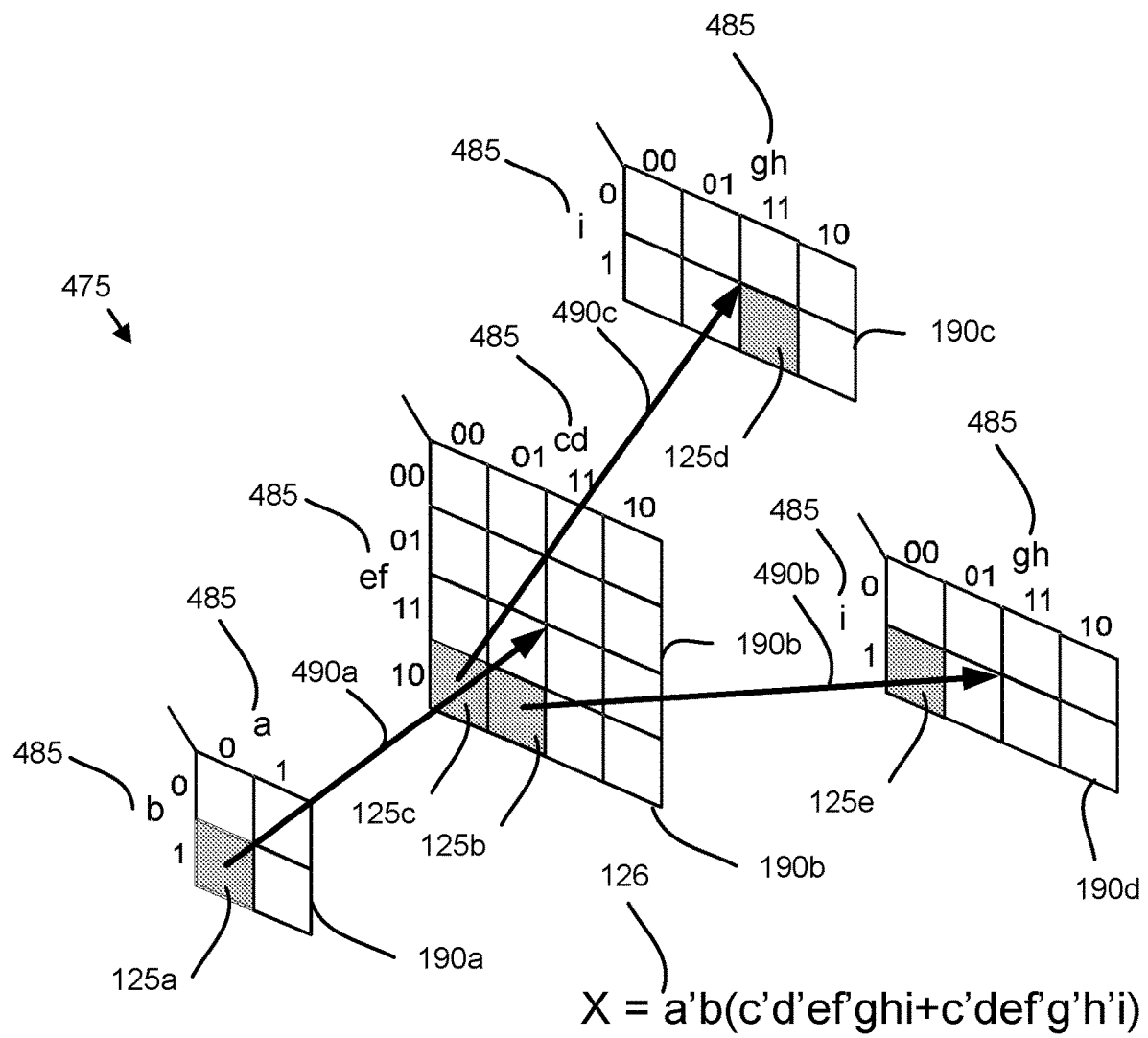
FIG. 3D is a drawing illustrating one embodiment of combination map levels.

FIG. 3D is a drawing illustrating one embodiment of combination map level display 475. A plurality of combination maps 190 are shown as though displayed on the display of the computer. Each field 125 may correspond to a logic state 205, one or more minterms 240, one or more maxterms 240, or combinations thereof.

In one embodiment, each combination map 190 on a lower level, such as combination maps 190b-d, corresponds to only one field 125 on a combination map 190 of an upper level, such as combination map 190a. The state input labels 485 may indicate the state inputs 465 such as present state values 220 and binary input variables 215 that define the fields 125. Assertion values 290 are also indicated for the state inputs 465.

In one embodiment, the fields 125 of the upper level combination maps 190 correspond to logic states 205. For example, each field 125 of the top-level combination map 190a may correspond to a logic state 205. Alternatively, the fields 125 of two or more upper level combination maps 190 may correspond to logic states 125. The state inputs 465 of the upper level combination maps 190 may be present state values 230 that indicate which logic state 205 is active.

A first field 125a of a first combination map 190a may be defined by a second combination map 190b as indicated by a first relationship arrow 490a. Each relationship arrow 490 may connect a field 125 of an upper level combination map 190 to a lower level combination map 190. The first combination map 190a may represent the present state values 220 $a$ and $b$.

The second combination map 190b may represent the Boolean equation cef'. A second relationship arrow 490b may indicate that a second field 125b of the second combination map 190b is defined by a fourth combination map 190d. The fourth combination map 190d may represent the Boolean equation g'h'i as indicated by asserting a fifth filed 125e. A third relationship arrow 490c may indicate that a third field 125c is defined by a third combination map 190c. The third combination map 190c may represent the Boolean equation ghi as indicated by asserting a fourth field 125d. In the depicted embodiment, the combination map level display 475 represents the Boolean equation 126 X=a'b (c'd'ef'ghi+c'def'g'h'i).

The plurality of combination maps 190 forms a multilevel display format. The multilevel display format has a top display level as illustrated by the first combination map 190a and at least one lower display levels as illustrated by the second and third combination maps 190b-c.

Each combination map 190 includes state input labels 485 that identify the state inputs 465 for the combination map 190. Relationship arrows 490 show the logical relationship between a combination map 190 and a field 125. The relationship arrows 490 may be defined by the relationship arrow data 175.

In one embodiment, relationship arrows 490 link a first field 125a with successive combination maps 190 at successive display levels. The relationship arrows 490 indicate a logical relationship between the fields 125.

A combination of first binary input variables 215 and/or present state values 220 for a first field 125a may be identified by selecting the first field 125a of a combination map 190a at first display level. In response to selecting the first field 125a, additional combinations of second binary input variables 215 in a successive combination map 190 that logically define the first field 125a may be identified. The combination map 190 of the second binary input variables 215 may be at a successive display level lower than the first display level.

In one embodiment, combination maps 190 of additional binary input variables 215 that logically define the selected first field 125a are displayed on combination maps 190 at each successive level until the last display level is reached. In one embodiment, the combination maps 190 may be logically collapsed. A binary output variable 225 may be assigned to the combination of all binary input variables 215 on each display level of the combination maps 190 for the selected first field 125a. In addition, the combination of all binary input variables 215 on each display level of the combination maps 190 may be converted into a logical expression 126.

Figure 3E:
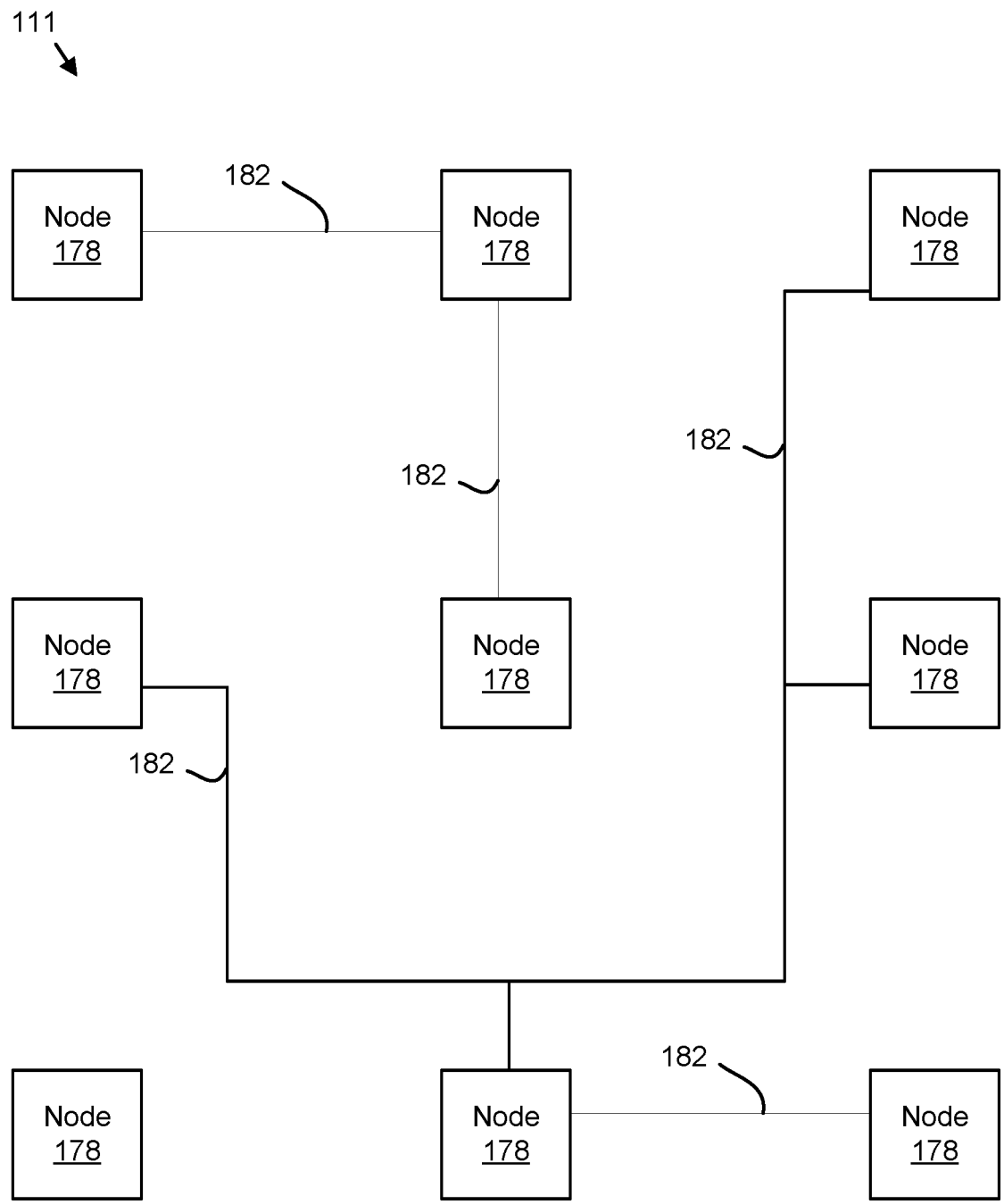
FIG. 3E is a schematic block diagram illustrating one embodiment of a semiconductor device.

FIG. 3E is a schematic block diagram illustrating one embodiment of a semiconductor device 111. In the depicted embodiment, the semiconductor device 111 implements the nodes 178 and paths 182 of the logic design 140 as the final logic design 145. The nodes 178 and paths 182 may be implemented as semiconductor gates 130. In a certain embodiment, the paths 182 a programmed to employ specified semiconductor gates 103.

Figure 4:
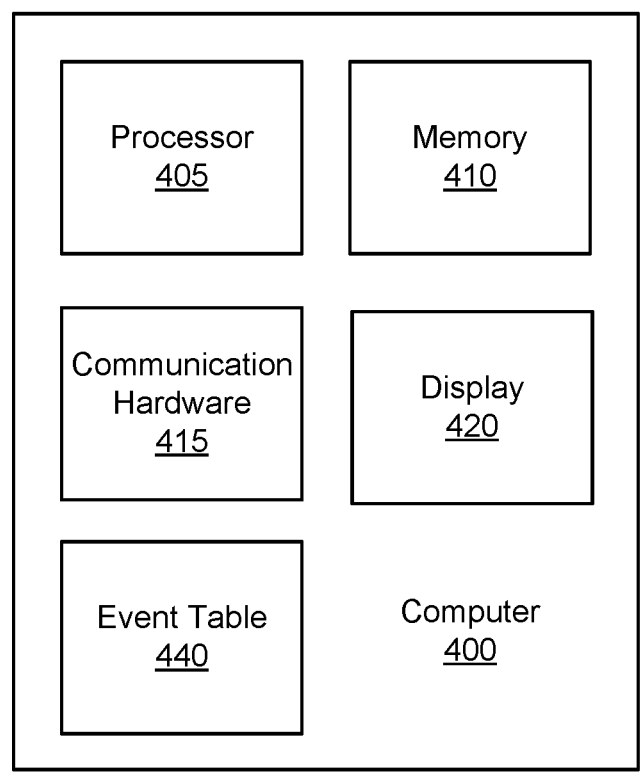
FIG. 4 is a schematic block diagram illustrating one embodiment of a computer.

FIG. 4 is a schematic block diagram illustrating one embodiment of a computer 400. The encoding module 104 and/or the risk evaluation module 105 may be embodied in the computer 400. In the depicted embodiment, the computer 400 includes a processor 405, a memory 410, communication hardware 415, and a display 420. The memory 410 may be a semiconductor storage device, a hard disk drive, an optical storage device, a micromechanical storage device, or combinations thereof. The memory 410 may store code. The processor 405 may execute the code. The communication hardware 415 may communicate with other devices. In addition, the communication hardware 415 may receive inputs from a user. The display 420 may communicate data to the user.

In one embodiment, the computer 400 includes an event table 440. The event table 440 may list standard events and standard event probabilities. For example, the event table 440 may include the standard event of an Atlantic hurricane on September 25, and the probability of a hurricane being in the Atlantic Ocean on any September 25th.

Figure 5A:
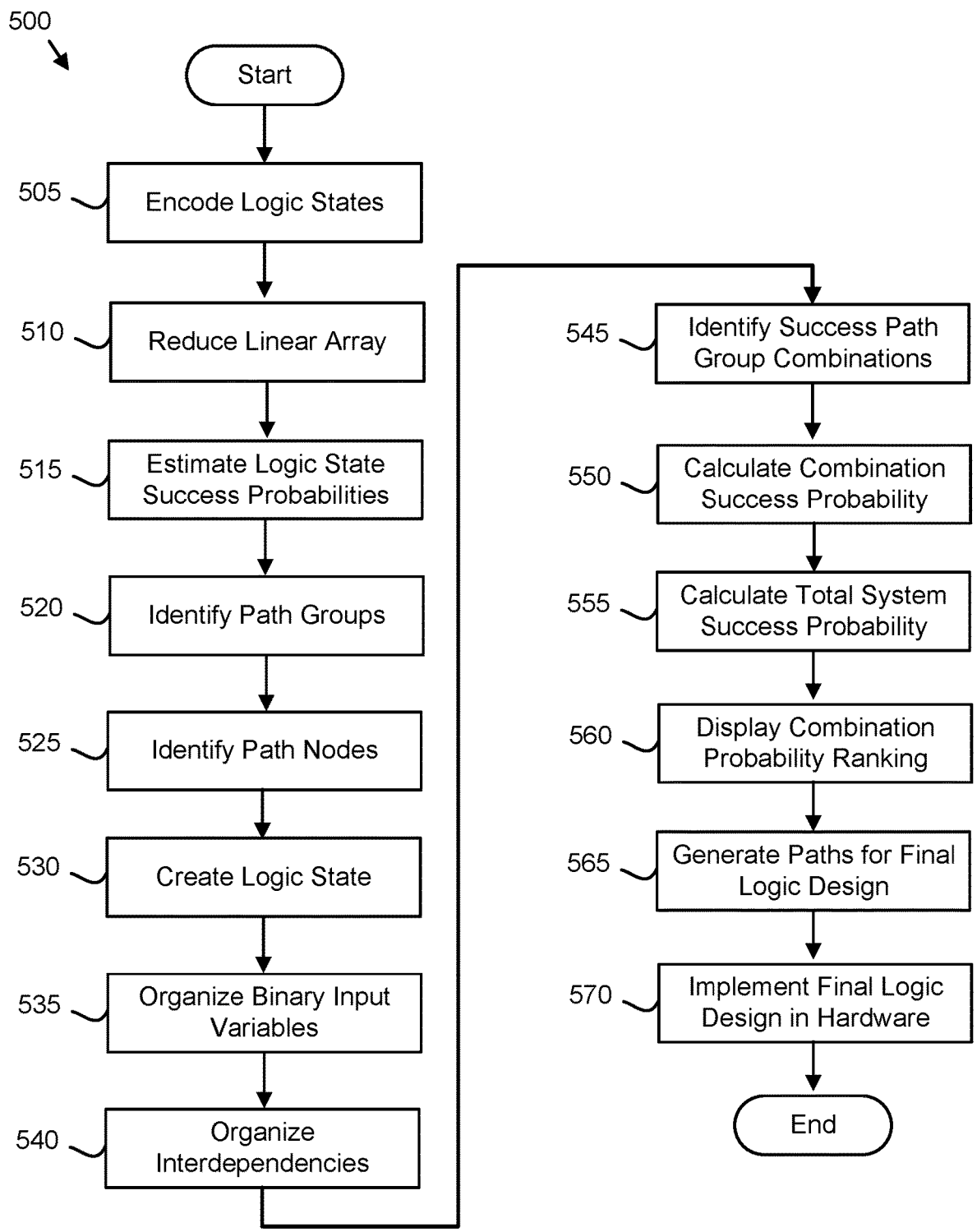
FIG. 5A is a schematic flow chart diagram illustrating one embodiment of a risk evaluation method.

FIG. 5A is a schematic flow chart diagram illustrating one embodiment of a risk evaluation method 500. The method 500 may employ the linear array 200 to calculate event probabilities. The method 500 may be performed by the processor 405. Alternatively, the method 500 may be performed by the computer readable storage medium such as the memory 410. The memory 410 may store code that is executed by the processor 405 to perform the functions of the method 500.

The method 500 starts, and in one embodiment, the processor 405 encodes 505 the event data 143 has one or more logic states 205 of a linear array 200. In one embodiment, the event data 143 is parsed to identify event elements 111 from events. Each event element 111 may be associated with a logic state 205. The node flag 435 may be cleared to indicate an event element 111. The logic state encoding 505 is described in more detail in FIG. 5B.

In one embodiment, the processor 405 reduces 510 the linear array 200 to a set of minimal logical expressions. The processor 405 may employ one or more of the Quine-McClusky algorithm and Espresso to reduce the linear array 200.

In one embodiment, the processor 405 estimates 515 the success probability 435 for each logic state 205. In one embodiment, the success probability 425 is parsed from the event data 143. Alternatively, the processor 405 may compare each event associated with the logic state 205 with the event table 440 of standard events and standard event probabilities. If there is a match between an event associated with the logic state 205 and a standard event in the event table 440, the processor 405 may assign the corresponding standard event probability as the success probability 425 for the logic state 205.

In one embodiment, the processor 405 may query a user for an estimate of the success probability 425. Alternatively, the processor 405 may present the user with two or more common events and have the user select the common event with approximately the same success probability as the event associated with the logic state 205. The processor 405 may record the user's estimated success probability 425 for the logic state 205.

The processor 405 may identify 520 the path groups 116 from the plurality of logic states 205. In one embodiment, the logic state 205 is a member of a path group 116 if the logic state 205 is healthy for each logic state 205 of the path group 116 to contribute to system success. In a certain embodiment, the logic states 205 of each path group 116 must all be healthy for each logic state 205 to contribute to system success. In addition, each path group 116 is healthy if the path group 116 achieves success. Thus, the logic states 205 of each path group 116 must all be healthy for each logic state 205 to contribute to system success.

In one embodiment, the interdependent relationships 430 are referenced to determine which logic states 205 are assigned to a given path group 116. For example, if a second logic state 205b associated with the second path element 111b is only healthy if a first path element 111a associated with a first logic state 205a is healthy, the second logic state 205b is assigned to the same path group 116 as the first logic state 205a.

In one embodiment, a logic state 205 may be assigned to only one path group 116. Alternatively, the logic state 205 may be assigned to one or more path groups 116.

The processor 405 may identify 525 one or more path nodes 106. In one embodiment, a path node 106 is identified 525 where two or more path groups 116 provide equivalent contributions to system success. For example, if either a first path group 116a or a second path group 116b achieving success may result in system success, the processor 405 may identify 525 a path node 106 that links the outcome of both the first path group 116a and the second path group 116b.

The processor 405 may create the path node 106 by creating 530 a logic state 205 associated with the path node 106. The logic state 205 may include binary input variables 215 of the one or more binary input variables 215. In addition, the processor 405 may set the node flag 435 for the logic state 205 to indicate that the logic state 205 is a path node 106. In one embodiment, each path node 106 is assigned the success probability 425 of 100%.

The processor 405 may organize 535 the one or more binary input variables 215 into a plurality of fields in one or more combination maps 190. Each field of the plurality of fields may correspond to a respective display level of a multi-level display format having a top display level combination map 190 and at least one lower display level combination map 190. The processor 405 may further organize 540 interdependencies between the logic states 205 using the combination maps 190.

In one embodiment, the processor 405 identifies 545 each path combination 189 of path groups 116 and path nodes 106 that result in system success. In the example of FIG. 1F, a first path combination 189 of path node 106a, path group 116a, path node 106b, path group 116d, path node 106c, path group 116f, and path node 106d results in system success. In addition, a second path combination 189 of path node 106a, path group 116b, path node 106b, path group 116e, path node 106c, path group 116f, and path node 106d also results in system success. Four additional path combinations 189 also result in system success, but are not described for brevity.

In one embodiment, each path combination 189 is an interdependency between a start logic state 205 and an end logic state 205 from the combinations maps 190 with the reduced computational complexity of the linear array 200 as will be described hereafter in FIG. 6A. The processor 405 may identify 545 path combinations 189 using the combination map 190. The combination map 190 organizes interdependencies between logic states 205. The processor 405 may automatically identify 545 the path combination 189 based on the interdependencies. Alternatively, the processor 405 may receive a selection of a first interdependency between logic states 205. The processor 405 may create a first path combination 189 from the logic states 205 of the first interdependency. In addition, the processor 405 may automatically identify 545 additional path groups 116 and path nodes 106 to add to the first path combination 189.

In one embodiment, the processor 405 calculates 550 the success probability 425 for each path combination 189. The success probability 425 may be calculated 550 as a function of the success probability 425 for each logic state 205 of the path combination 189. Alternatively, the success probability 425 for the path combination 189 may be calculated 550 as a function of the success probability 425 for each path group 116 of the path combination 189. In a certain embodiment, the success probability 425 for the path combination 189 is calculated 550 as a product of each success probability 425 for each logic state 205 or each path group 116 of the path combination 189.

For example, the success probability 425 of a path group 116 may be a product of the success probabilities 425 for each logic state 205 in the path group 116. Similarly, the success probability 425 of a path combination 189 may be a product of the success probabilities 425 for each path group 116 or ungrouped logic state 205 in the path combination 189.

The processor 405 may calculate 555 the total system success probability 425 of system success. In one embodiment, the total system success probability 425 is calculated as the sum of success probabilities 425 for each path combination 189.

In one embodiment, the processor 405 displays 560 probability rankings for each of the path combinations 189. For example, the path combination 189 with the highest success probability 425 may be ranked first, while another path combination 189 with the next highest success probability 425 may be ranked second.

The processor 405 may generate 565 paths 182 for a final logic design from the linear array 200 based on the success probabilities 425 for each path combination 189. In addition, the processor 405 may implement 570 the final logic design in hardware by generating semiconductor gates that implement the paths 182.

Figure 5B:
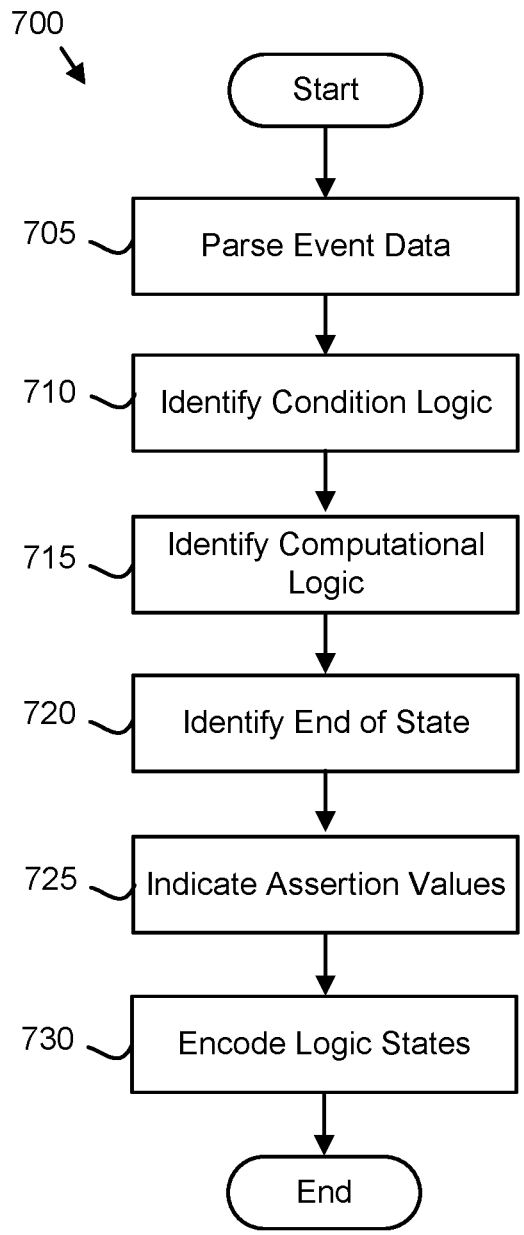
FIG. 5B is a schematic flowchart diagram illustrating one embodiment of a logic state encoding method.

FIG. 5B is a schematic flowchart diagram illustrating one embodiment of a logic state encoding method 700. The method 700 may encode the event data 143 as one or more logic states 205 of the linear array 200. The method 700 may perform step 505 of FIG. 5A. The method 700 may be performed by the processor 405.

Alternatively, the method 700 may be performed by the computer readable storage medium such as the memory 410. The memory 410 may store code that is executed by the processor 405 to perform the functions of the method 700.

The method 700 starts, and in one embodiment, the processor 405 parses 705 the event data 143 into the logic transformation 150. The processor 405 may segment the event data 143 into a plurality of logic design elements 130. In one embodiment, each logic design element 130 is a line of the event data 143. Alternatively, the processor 405 may parse 705 the event data 143 into logic design elements 130 where each logic design element 130 begins with conditional logic 172. In one embodiment, each logic design element 130 is a data structure of the event data 143.

The processor 405 may identify 710 conditional logic 172 in each logic design element 130. Identifying 710 the conditional logic 172 may include identifying one or more conditions, an event definition, one or more event relationships, and/or one or more event dependencies. In one embodiment, the processor 405 may further identify 710 the next state values 230 for the logic transformation 150 from the conditional logic 172. In addition, the processor 405 may identify 710 the input data 160 for the logic transformation 150 from the conditional logic 172.

In addition, the processor 405 may identify 715 computational logic 134 in each logic design element 130. Identifying 715 the computational logic 134 may include events, event probabilities, event descriptions, identifying actions, identifying computational statements, and the like. The processor 405 may identify 715 the binary output variables 225 for the logic transformation 150 from the computational logic 134. In addition, the processor 405 may identify 715 the input data 160 for the logic transformation 150 from the computational logic 134.

In one embodiment, the processor 405 identifies 720 the end of state 136 for each logic design element 130. The end of state 136 may be an end of an event definition, an end of a conditional statement, the end of a sequence of instructions that are executed in response to conditional logic 172 being satisfied, or the like.

The processor 405 may indicate 725 assertion values for the binary input variables 215, the present state values 220, the binary output variables 225, and the next state values 230. In one embodiment, an assertion indicator 295 is associated with each of the binary input variables 215, the present state values 220, the binary output variables 225, and the next state values 230.

The processor 405 may encode 730 the logic state 205 from the logic transformation 150 and the method 700 ends. In one embodiment, the logic state 205 is assigned present state values 220. The present state values 220 may be assigned to minimize the minterms 240 and the maxterms 235 that generate the present state values 220. In addition, the next state values 230 for the logic state 205 may be generated from the next state values 230 of the logic transformation 150. In one embodiment, the next state values 230 for the logic state 205 are equivalent to the next state values 230 of the logic transformation 150.

The binary input variables 215 of the logic state 205 may be generated from the binary input variables 215 of the logic transformation 150. In one embodiment, the binary input variables 215 of the logic state 205 are equivalent to the binary input variables 215 of the logic transformation 150.

The processor 405 may further encode 730 the logic state 205 by generating the minterms 240 and the maxterms 235 from the computational logic 134. In one embodiment, the minterms 240 in the maxterms 235 are structured to be logically equivalent to the computational logic 134.

The processor 405 may further assign one or more maxterms 235 to each binary output variable 225 and/or each next state value 230. Alternatively, the processor 405 may assign one or more minterms 240 to each binary output variable 225 and/or each next state value 230.

Figure 6A:
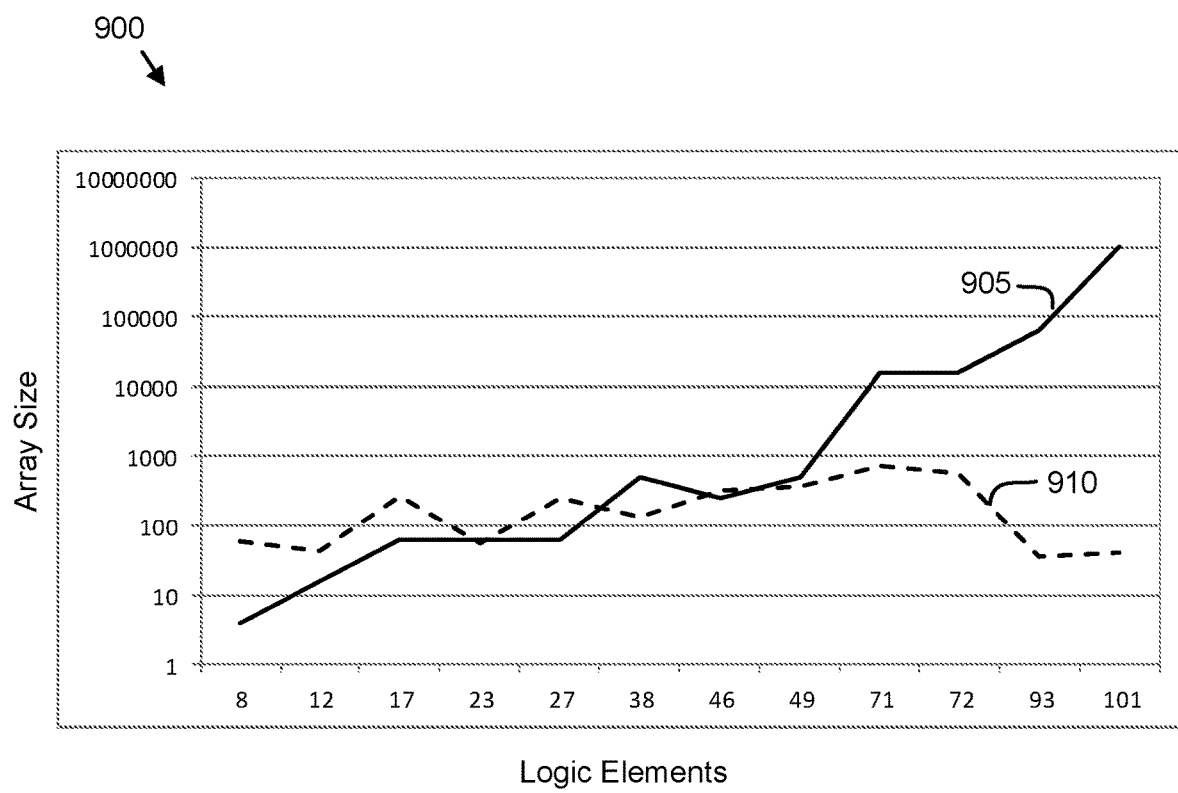
FIG. 6A is a graph illustrating one embodiment of array complexity.

FIG. 6A is a graph 900 illustrating one embodiment of array complexity. The graph 900 shows an array size 905 for a multidimensional array of the logic design 140 and an array size 910 for a corresponding linear array 200 for multiple pairs of identical function implementations with various numbers of logic elements 176. For example, a first function implementation of 27 logic elements 176 may be implemented as a pair of arrays comprising a multidimensional array and a linear array 200. The array size 905, 910 is shown on a log scale. Array size 905, 910 is one measure of array complexity and a good predictor of the computational overhead required to process an array.

The graph 900 illustrates that the array size 905 for multidimensional array implementations quickly becomes orders of magnitude larger than the corresponding array size 910 for linear array implementations. By encoding the logic design 140 as a linear array 200, array size is greatly reduced, reducing the computational complexity of processing the linear array 200. The computational complexity is reduced as far fewer path combinations 189 and interdependencies analyzed, accelerating the calculation of success probabilities 425 for the path combinations 189.

Figure 6B:
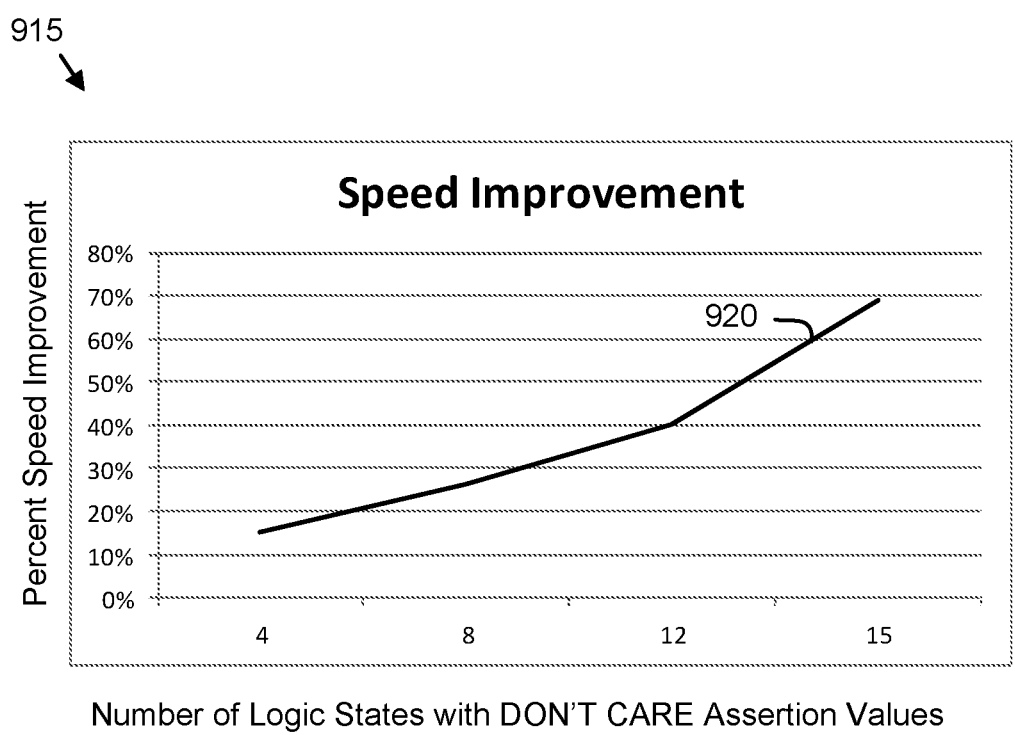
FIG. 6B is a graph illustrating one embodiment of speed improvements from identifying DON'T CARE assertion values.

FIG. 6B is a graph 915 illustrating one embodiment of speed improvements 920 from identifying DON'T CARE assertion values 290. A percentage speed improvement is shown as a result of identifying DON'T CARE assertion values 290 for minterms 240 of 4, 8, 12, and 15 logic states 205 of an exemplary linear array 200. The speed improvement 920 is calculated by comparing processing time for the exemplary linear array 200 without identifying the DON'T CARE assertion values 290, and the processing time for the exemplary linear array 200 when DON'T CARE assertion values 290 are identified for minterms 240 of 4, 8, 12, and 15 logic states 205 of the linear array 240 shown in Table 1. Table 1 shows an estimate of processing time as a function of linear array size for minterms 240 of 4, 8, 12, and 15 logic states 205 having either deasserted assertion values 290 or DON'T CARE assertion values 290.

TABLE 1

|  | 4 Logic States | 8 Logic States | 12 Logic States | 15 Logic States |
| --- | --- | --- | --- | --- |
| Deasserted | 645 | 499 | 362 | 251 |
| DON'T CARE | 547 | 369 | 216 | 78 |

The graph 915 shows the processing perform efficiencies that are realized from identifying DON'T CARE assertion values 290.

The embodiments identify path groups 116, path nodes 106, and path combinations 189 to reduce the number of combinations of path elements 111 that are considered in determining the total system success probability. As a result, the computation of path combination success probabilities 425 and the total system success probability is greatly simplified, and the computational resources required for the calculations are greatly reduced.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   encoding, by use of a processor, event data for a net list logic design as a linear array comprising a plurality of logic states, wherein each logic state represents a path between events of the event data, each logic state comprising one or more binary output variables, one or more binary input variables, one or more minterms of the one or more binary input variables, one or more maxterms of the one or more minterms, one or more present state values, and one or more next state values;
   estimating a success probability for each logic state by parsing the success probability from event data corresponding to the logic state;
   identifying path groups of the plurality of logic states, wherein the logic states of each path group must all be healthy for each logic state to contribute to system success, wherein each path group is healthy if the path group achieves success;
   identifying path nodes wherein the system success is achieved if any one path group of two or more path groups achieves success;
   creating a logic state comprising binary input variables of the one or more binary input variables and a success probability of 100% for each path node;
   identifying each path combination of path groups and path nodes that result in the system success as an interdependency between a start logic state and an end logic state from the combinations maps with the reduced computational complexity of the linear array;
   calculating a system success probability as a sum of success probabilities for each path combination, wherein the success rate for each path combination is calculated as a product of the path group success probabilities for the path combination;
   generating paths for a final logic design from the linear array based on the success probabilities for each path combination; and
   implementing the final logic design in hardware by generating semiconductor gates that implement the paths.

2. The method of claim 1, the method further comprising calculating a success probability for each path combination.

3. The method of claim 1, the method further comprising displaying a probability ranking for each path combination.

4. The method of claim 1, the method further comprising:
   parsing the logic design into a plurality of logic design elements;
   identifying conditional logic for each logic design element;
   identifying computation logic for each logic design element; and
   identifying an end of state logic design element.

5. The method of claim 1, the method further comprising:
   organizing the one or more binary input variables into a plurality of fields in one or more combination maps, each field of the plurality of fields corresponding to a respective display level of a multi-level display format having a top display level combination map and at least one lower display level combination map;
   organizing interdependencies between the logic states using the combination maps; and
   identifying the path combinations resulting in the system success using the combination maps.

6. The method of claim 5, wherein the combination maps are organized by:
   selecting a first field of the plurality of fields, the first field corresponding to a first display level;

identifying combinations of the binary input variables of a successive combination map that logically defines the first field of the plurality of fields, wherein the successive combination map is at a successive display level lower than the first display level;

displaying at each successive display level, combination maps of additional binary input variables that logically define the first field at each successive level until a last display level is reached; and converting the combination of binary input variables for each display level into a logical expression.

7. A program product comprising a non-transitory computer readable storage medium that stores code executable by a processor to perform:

encoding event data for a net list logic design as a linear array comprising a plurality of logic states, wherein each logic state represents a path between events of the event data, each logic state comprising one or more binary output variables, one or more binary input variables, one or more minterms of the one or more binary input variables, one or more maxterms of the one or more minterms, one or more present state values, and one or more next state values;

estimating a success probability for each logic state by parsing the success probability from event data corresponding to the logic state;

identifying path groups of the plurality of logic states, wherein the logic states of each path group must all be healthy for each logic state to contribute to system success, wherein each path group is healthy if the path group achieves success;

identifying path nodes wherein the system success is achieved if any one path group of two or more path groups achieves success;

creating a logic state comprising binary input variables of the one or more binary input variables and a success probability of 100% for each path node;

identifying each path combination of path groups and path nodes that result in the system success as an interdependency between a start logic state and an end logic state from the combinations maps with the reduced computational complexity of the linear array;

calculating a system success probability as a sum of success probabilities for each path combination, wherein the success rate for each path combination is calculated as a product of the path group success probabilities for the path combination;

generating paths for a final logic design from the linear array based on the success probabilities for each path combination; and implementing the final logic design in hardware by generating semiconductor gates that implement the paths.

8. The program product of claim 7, the processor further calculating a success probability for each path combination.

9. The program product of claim 7, the processor further displaying a probability ranking for each path combination.

10. The program product of claim 7, the processor further:

parsing the logic design into a plurality of logic design elements;

identifying conditional logic for each logic design element;

identifying computation logic for each logic design element; and identifying an end of state logic design element.

11. The program product of claim 7, the processor further:

organizing the one or more binary input variables into a plurality of fields in one or more combination maps, each field of the plurality of fields corresponding to a respective display level of a multi-level display format having a top display level combination map and at least one lower display level combination map;

organizing interdependencies between the logic states using the combination maps; and identifying the path combinations resulting in the system success using the combination maps.

12. The program product of claim 11, wherein the combination maps are organized by:

selecting a first field of the plurality of fields, the first field corresponding to a first display level;

identifying combinations of the binary input variables of a successive combination map that logically defines the first field of the plurality of fields, wherein the successive combination map is at a successive display level lower than the first display level;

displaying at each successive display level, combination maps of additional binary input variables that logically define the first field at each successive level until a last display level is reached; and converting the combination of binary input variables for each display level into a logical expression.

13. An apparatus comprising:

a processor;

a non-transitory memory that stores code executable by the processor to perform:

encoding event data for a net list logic design as a linear array comprising a plurality of logic states, wherein each logic state represents a path between events of the event data, each logic state comprising one or more binary output variables, one or more binary input variables, one or more minterms of the one or more binary input variables, one or more maxterms of the one or more minterms, one or more present state values, and one or more next state values;

estimating a success probability for each logic state by parsing the success probability from event data corresponding to the logic state;

identifying path groups of the plurality of logic states, wherein the logic states of each path group must all be healthy for each logic state to contribute to system success, wherein each path group is healthy if the path group achieves success;

identifying path nodes wherein the system success is achieved if any one path group of two or more path groups achieves success;

creating a logic state comprising binary input variables of the one or more binary input variables and a success probability of 100% for each path node;

identifying each path combination of path groups and path nodes that result in the system success as an interdependency between a start logic state and an end logic state from the combinations maps with the reduced computational complexity of the linear array;

calculating a system success probability as a sum of success probabilities for each path combination, wherein the success rate for each path combination is calculated as a product of the path group success probabilities for the path combination;

generating paths for a final logic design from the linear array based on the success probabilities for each path combination; and implementing the final logic design in hardware by generating semiconductor gates that implement the paths.

14. The apparatus of claim 13, the processor further calculating a success probability for each path combination.

15. The apparatus of claim 13, the processor further displaying a probability ranking for each path combination.

16. The apparatus of claim 13, the processor further:
parsing the logic design into a plurality of logic design elements;
identifying conditional logic for each logic design element;
identifying computation logic for each logic design element; and
identifying an end of state logic design element.

17. The apparatus of claim 13, the processor further:
organizing the one or more binary input variables into a plurality of fields in one or more combination maps, each field of the plurality of fields corresponding to a respective display level of a multi-level display format having a top display level combination map and at least one lower display level combination map;
organizing interdependencies between the logic states using the combination maps; and
identifying the path combinations resulting in the system success using the combination maps.

18. The apparatus of claim 17, wherein the combination maps are organized by:
selecting a first field of the plurality of fields, the first field corresponding to a first display level;
identifying combinations of the binary input variables of a successive combination map that logically defines the first field of the plurality of fields, wherein the successive combination map is at a successive display level lower than the first display level;
displaying at each successive display level, combination maps of additional binary input variables that logically define the first field at each successive level until a last display level is reached; and
converting the combination of binary input variables for each display level into a logical expression.

* * * * *